US009933948B2

(12) United States Patent
Saitou et al.

(10) Patent No.: US 9,933,948 B2
(45) Date of Patent: Apr. 3, 2018

(54) TIERED STORAGE SYSTEM, COMPUTER USING TIERED STORAGE DEVICE, AND METHOD OF CORRECTING COUNT OF ACCESSES TO FILE

(71) Applicants: KABUSHIKI KAISHA TOSHIBA, Tokyo (JP); TOSHIBA SOLUTIONS CORPORATION, Kawasaki-shi, Kanagawa (JP)

(72) Inventors: Shouhei Saitou, Tokyo (JP); Shinya Ando, Tokyo (JP)

(73) Assignees: Kabushiki Kaisha Toshiba, Tokyo (JP); Toshiba Solutions Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 15/265,589

(22) Filed: Sep. 14, 2016

(65) Prior Publication Data

US 2017/0060744 A1 Mar. 2, 2017

Related U.S. Application Data

(63) Continuation of application No. PCT/JP2015/073863, filed on Aug. 25, 2015.

(51) Int. Cl.
*G06F 13/00* (2006.01)
*G06F 3/06* (2006.01)

(52) U.S. Cl.
CPC ............. *G06F 3/061* (2013.01); *G06F 3/065* (2013.01); *G06F 3/0631* (2013.01); *G06F 3/0647* (2013.01); *G06F 3/0685* (2013.01)

(58) Field of Classification Search
CPC ...... G06F 3/061; G06F 3/0685; G06F 3/0647; G06F 3/065; G06F 3/0631; G06F 17/30088; G06F 17/30221; G06F 3/0683
USPC ........ 711/4, 5, 154, 161, 162, 200, 117, 111
See application file for complete search history.

(56) References Cited

U.S. PATENT DOCUMENTS

| 2013/0036280 | A1 | 2/2013 | Futawatari et al. |
| 2013/0080703 | A1* | 3/2013 | Kumagai ............. G06F 9/5072 711/117 |
| 2013/0138899 | A1* | 5/2013 | Miyamoto ............ G06F 3/0605 711/154 |
| 2015/0193152 | A1 | 7/2015 | Ohira et al. |
| 2015/0220280 | A1 | 8/2015 | Ishizaki |

(Continued)

FOREIGN PATENT DOCUMENTS

| JP | 9-44381 | 2/1997 |
| JP | 2013-168162 | 8/2013 |

(Continued)

*Primary Examiner* — Hong Kim
(74) *Attorney, Agent, or Firm* — Finnegan, Henderson, Farabow, Garrett & Dunner, L.L.P.

(57) ABSTRACT

According to one embodiment, a tiered storage system includes a tiered storage device and a computer. The computer uses the tiered storage device, and includes a file system and a correction support unit. If an access request from an application is a write request to request overwriting of data, the file system executes a copy-on-write operation. The correction support unit causes the storage controller to carry over an access count manacled by the storage controller and associated with the logical block address of a copy source in the copy-on-write operation, to an access count associated with the logical block address of a copy destination in the copy-on-write operation.

20 Claims, 22 Drawing Sheets

(56) References Cited

U.S. PATENT DOCUMENTS

| | | | |
|---|---|---|---|
| 2015/0286436 A1* | 10/2015 | Olson | G06F 3/0619 |
| | | | 711/162 |
| 2016/0011819 A1* | 1/2016 | Guo | G06F 3/061 |
| | | | 711/103 |
| 2016/0085480 A1* | 3/2016 | Chiu | G06F 3/0647 |
| | | | 711/117 |

FOREIGN PATENT DOCUMENTS

| | | |
|---|---|---|
| WO | WO 2013/018132 A1 | 2/2013 |
| WO | WO 2013/160958 A1 | 10/2013 |
| WO | WO 2015/114809 A1 | 8/2015 |

\* cited by examiner

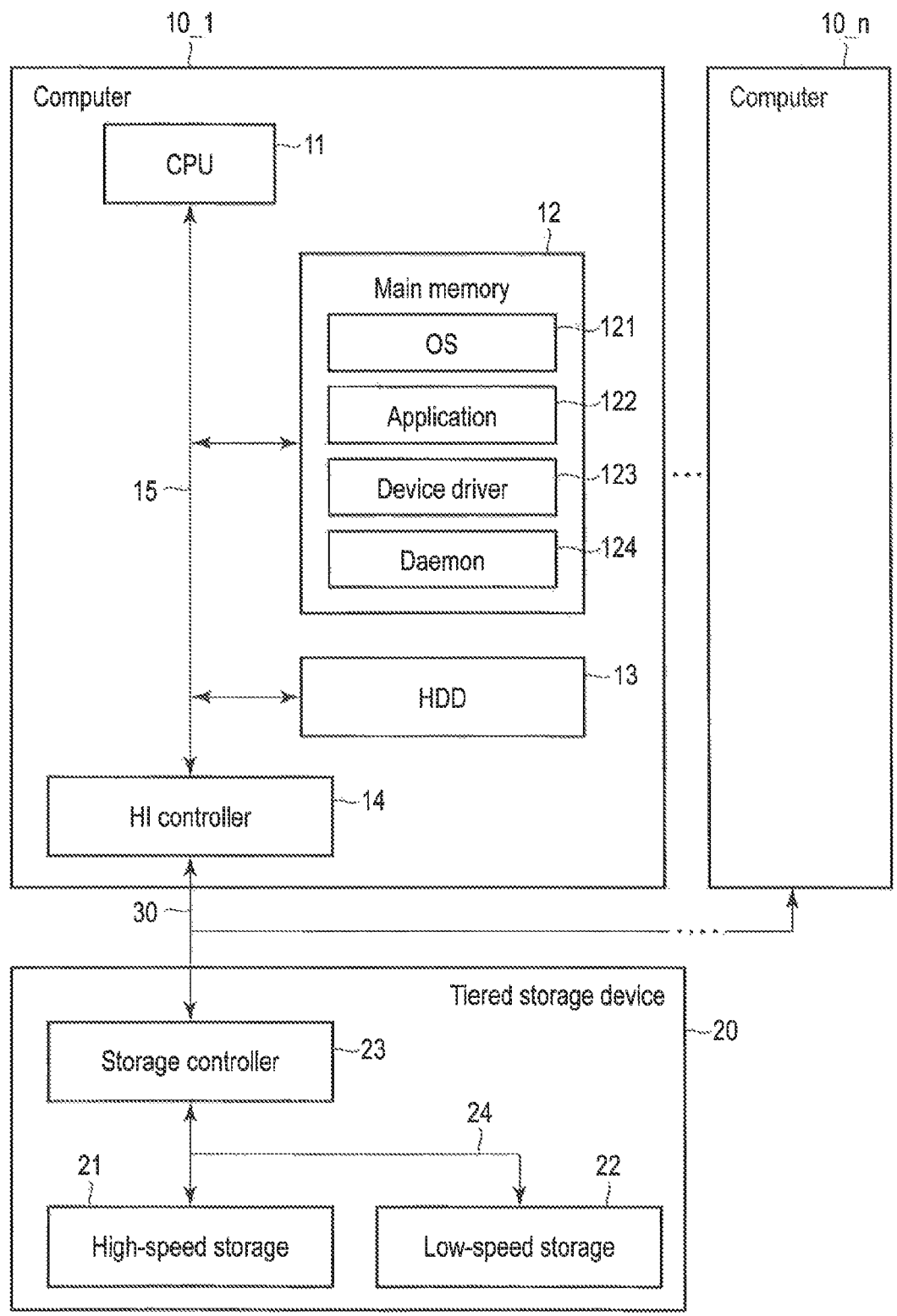
F I G. 1

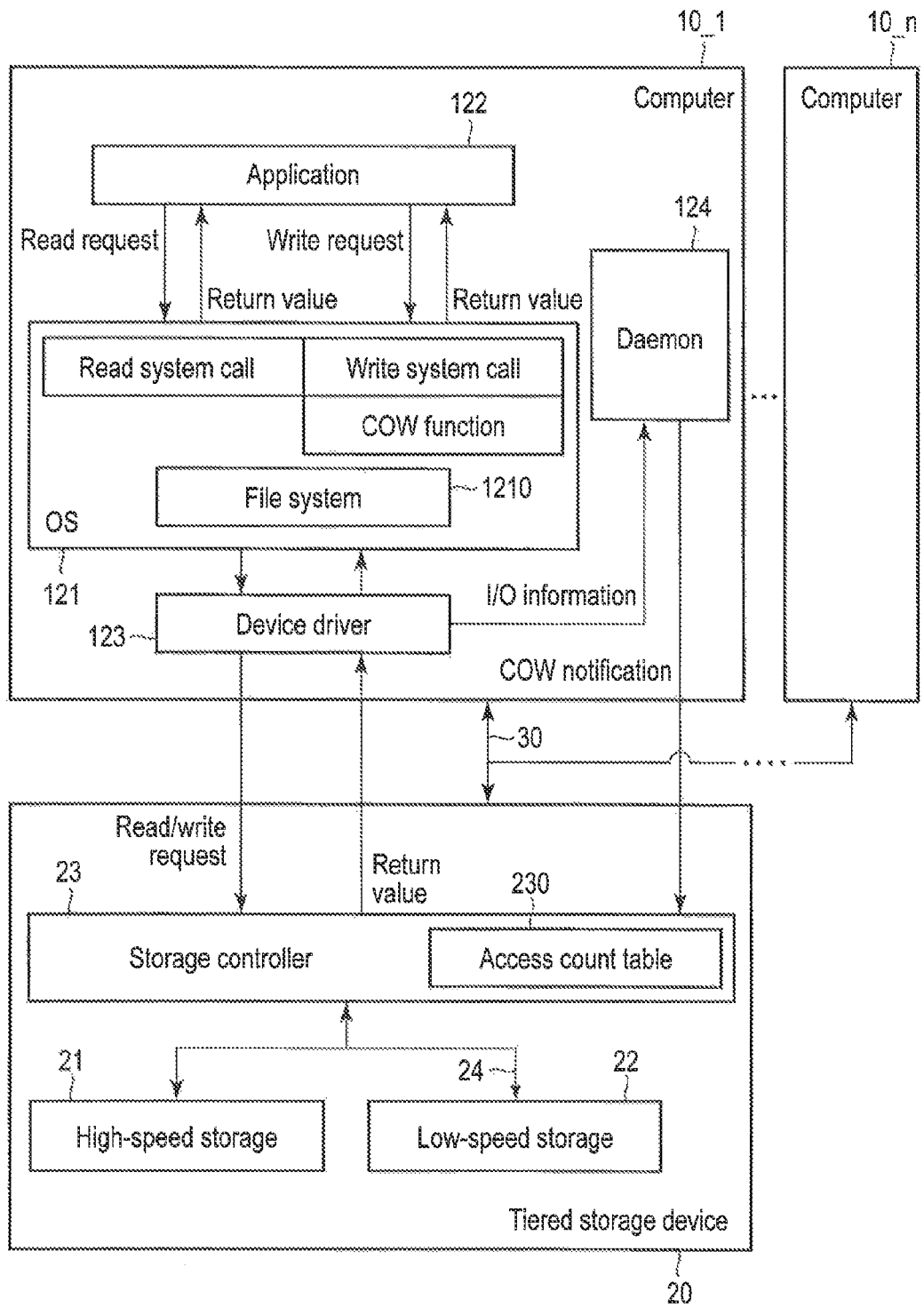
F I G. 2

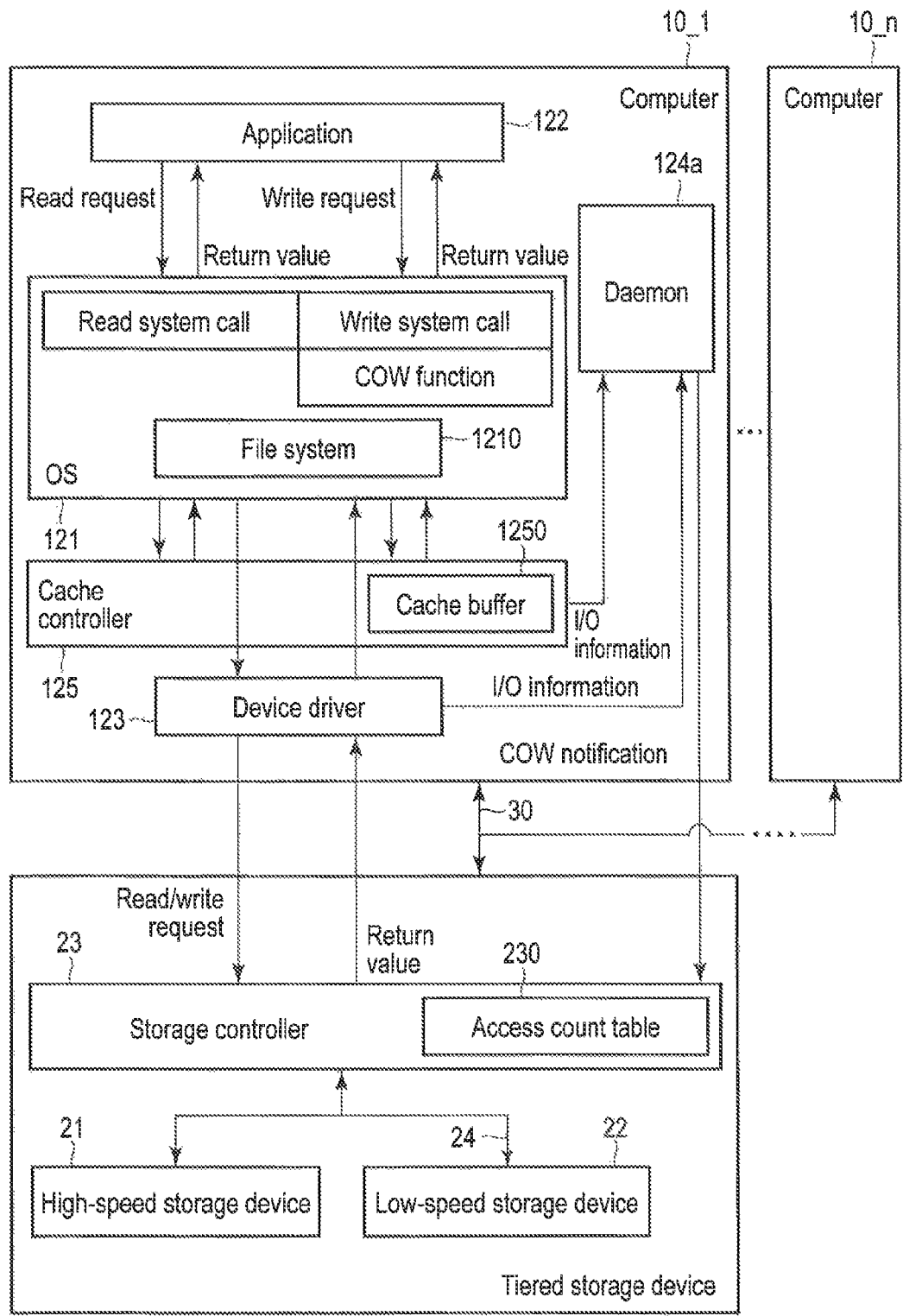
F I G. 10

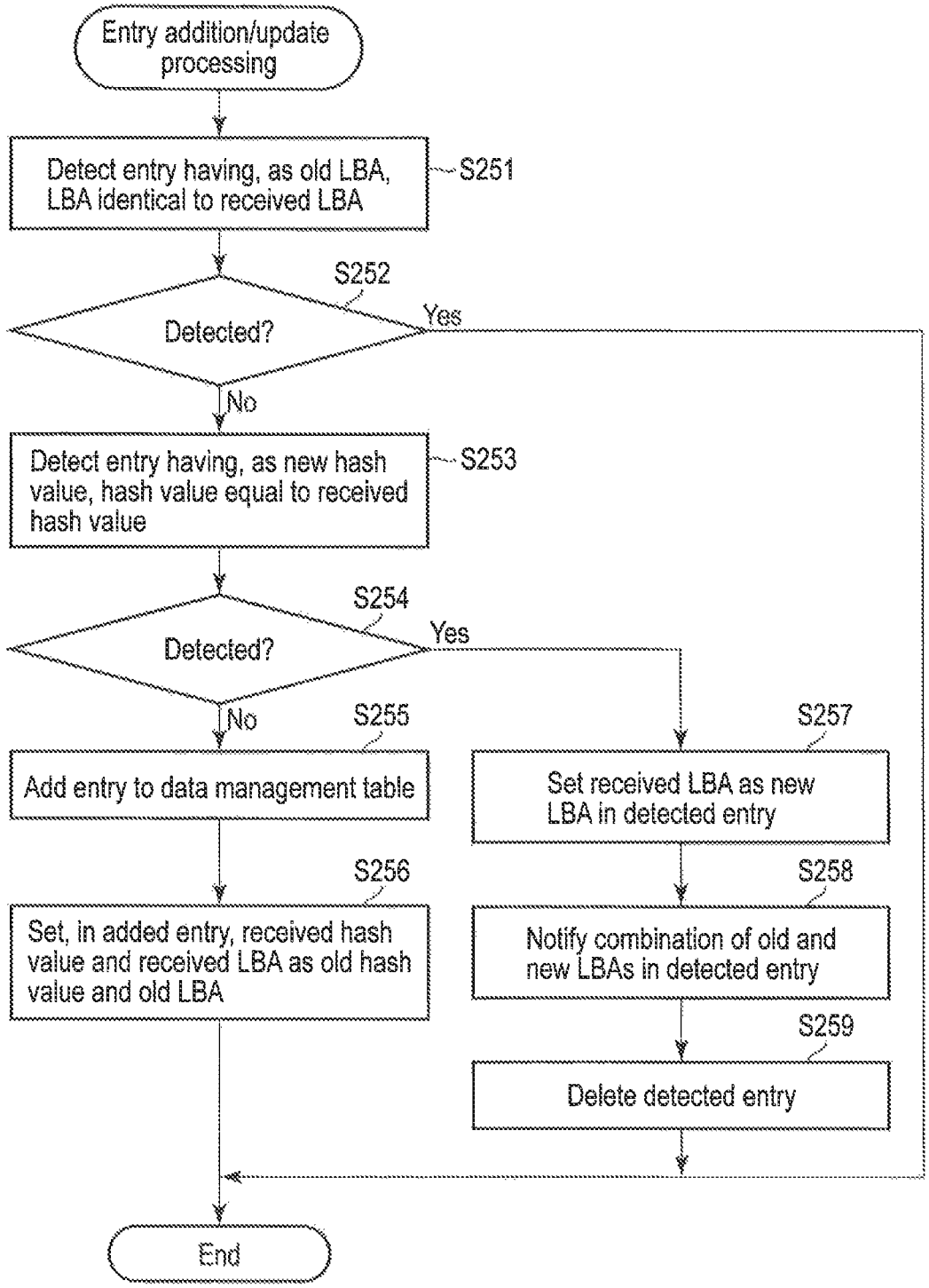
F I G. 14

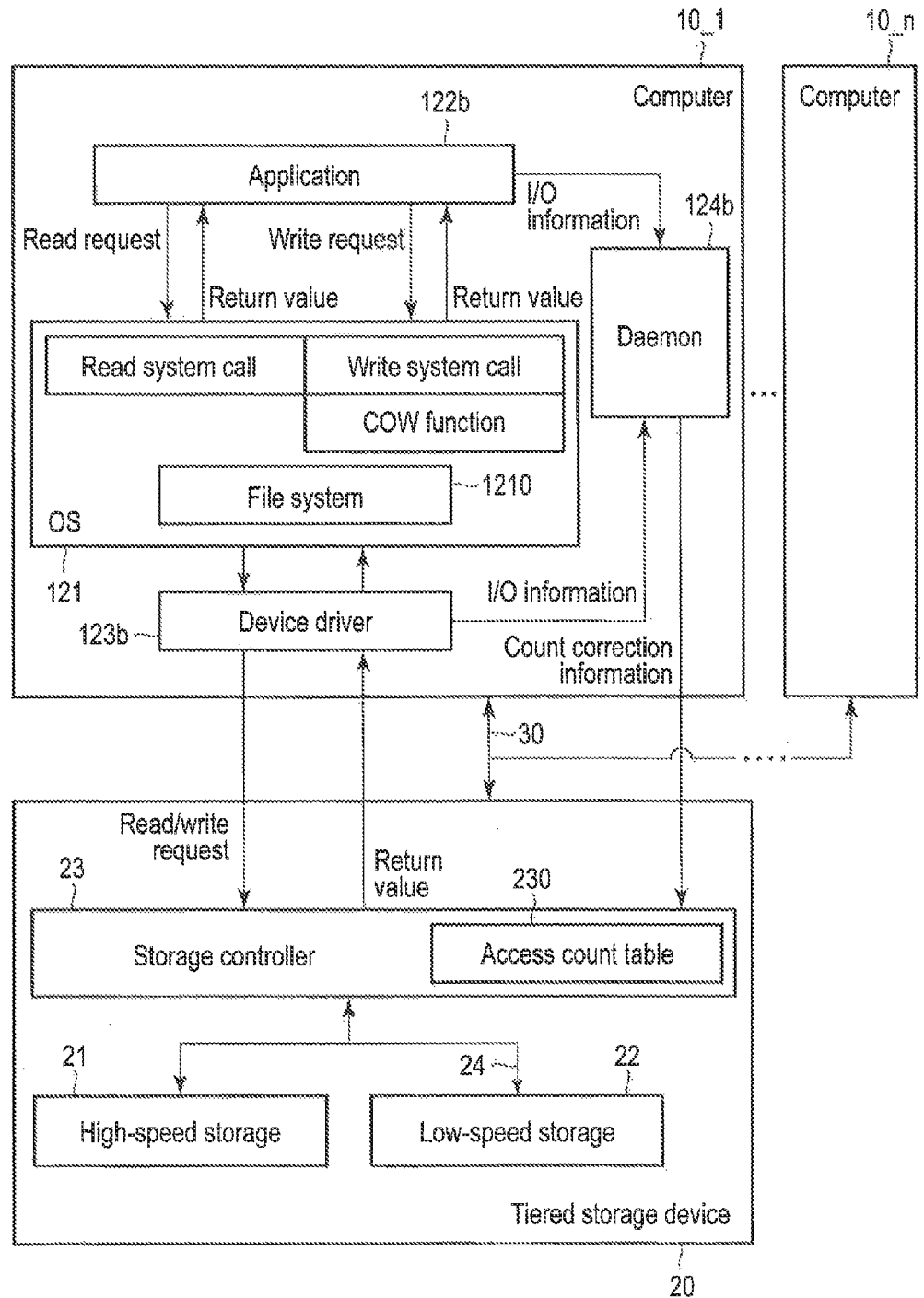
F I G. 18

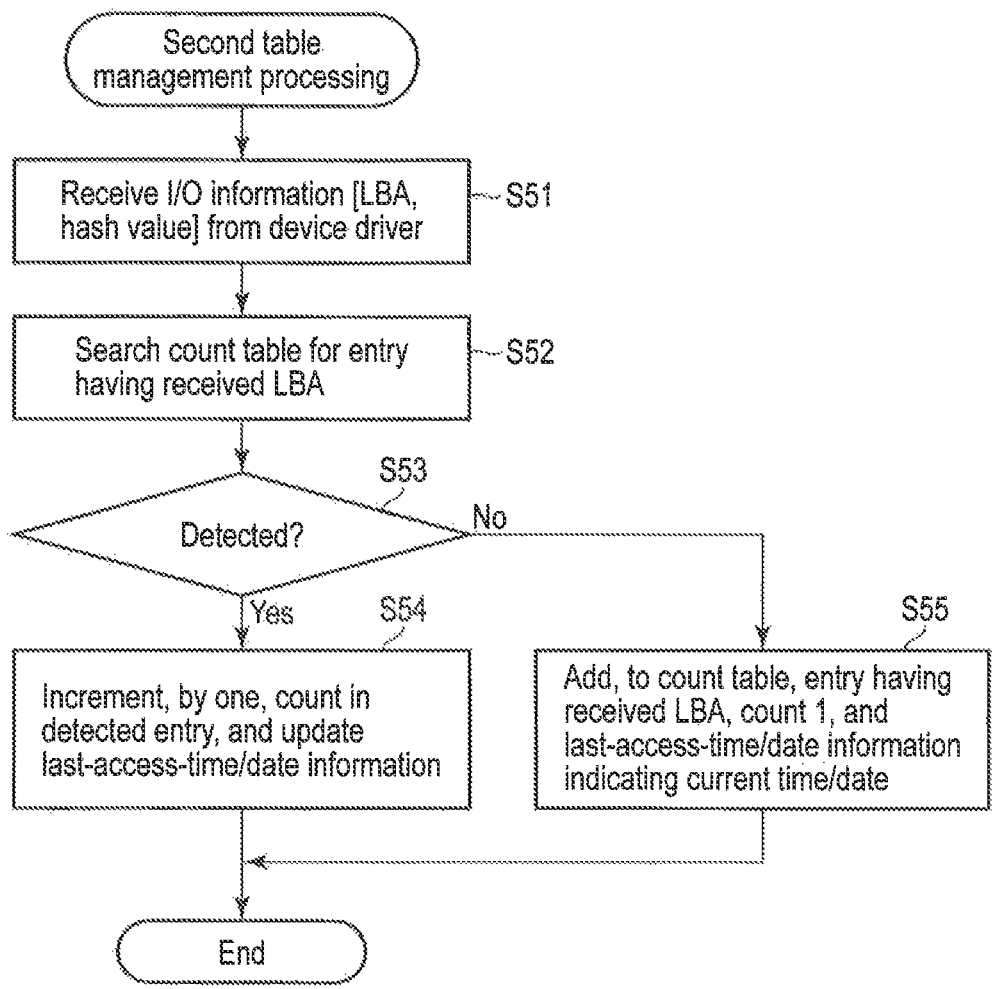
F I G. 23

301

| Filename (E1) | Offset (E2) | LBA list (E3) |
|---|---|---|
| F1 | 0 | 1 |

| LBA (G1) | Count (G2) | Last access time/date (G3) |
|---|---|---|
| 1 | 1 | 2015/xx/yy 15:00 |

| LBA (G1) | Count (G2) | Last access time/date (G3) |
|---|---|---|
| 1 | 1 | 2015/xx/yy 15:00 |

~2601

A21 ↓

302

| LBA (G1) | Count (G2) | Last access time/date (G3) |
|---|---|---|
| 1 | 2 | 2015/xx/yy 16:00 |

~2601

A22 ↓

302

| LBA (G1) | Count (G2) | Last access time/date (G3) |
|---|---|---|
| 1 | 2 | 2015/xx/yy 16:00 |
| 2 | 1 | 2015/xx/yy 17:00 |

| | Filename (E1) | Offset (E2) | LBA list (E3) |
|---|---|---|---|
| 301 → | F1 | 0 | 1, 2 | ← 2501

FIG. 29

| LBA | Correction count |
|---|---|
| 1 | -2 |
| 2 | +2 |

FIG. 30

| | LBA (411) | Count (412) | |
|---|---|---|---|
| 230 → | 1 | 3 | ← 3001 |
| | 2 | 2 | ← 3002 |

FIG. 31

| | LBA (411) | Count (412) | |
|---|---|---|---|
| 230 → | 1 | 1 | ← 3001 |
| | 2 | 4 | ← 3002 |

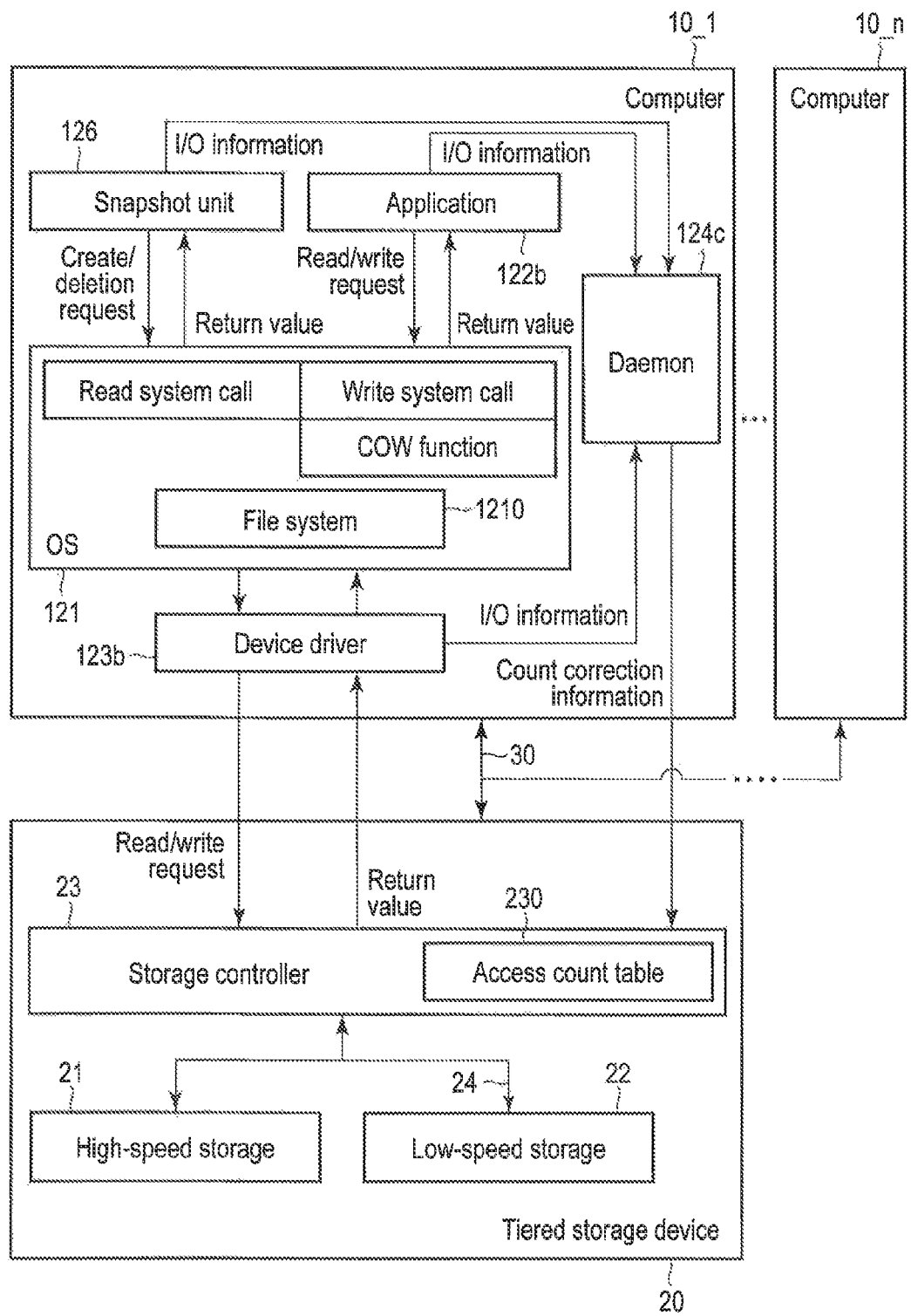
F I G. 32

| | G1 | G2 | G3 | G4 |
|---|---|---|---|---|
| 302c | LBA | Count | Last access time/date | Reference count |
| | 1 | 10 | 2015/xx/yy 15:00 | 1 |
| | 2 | 20 | 2015/xx/yy 16:00 | 3 |
| | 3 | 30 | 2015/xx/yy 17:00 | 2 |
| | ... | ... | ... | ... |

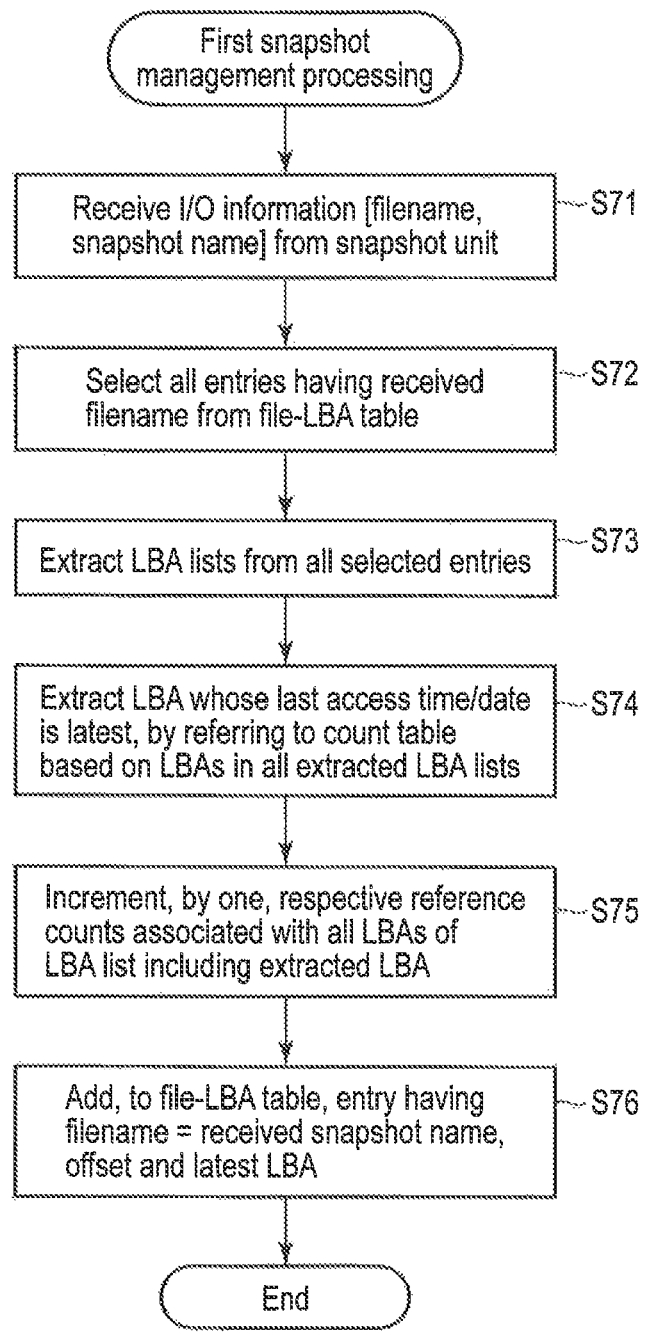
F I G. 35

TIERED STORAGE SYSTEM, COMPUTER USING TIERED STORAGE DEVICE, AND METHOD OF CORRECTING COUNT OF ACCESSES TO FILE

CROSS-REFERENCE TO RELATED APPLICATIONS

This application is a Continuation Application of PCT Application No. PCT/JP2015/073863, filed Aug. 25, 2015, the entire contents of which are incorporated herein by reference.

FIELD

Embodiments described herein relate generally to a tiered storage system, a computer using a tiered storage device, and a method of correcting the count of accesses to a file.

BACKGROUND

A storage system including a first storage device and a second storage device that have different access speeds has recently been developed. Assume here that the access speed and storage capacity of the first storage device are high and small, respectively, and that the access speed and storage capacity of the second storage device are lower and greater than those of the first storage device, respectively. The storage system is realized by hierarchically combining the first storage device (hereinafter, referred to as the high-speed storage device) and the second storage device (hereinafter, referred to as the low-speed storage device). This storage system is also called a tiered storage system.

In the tiered storage system, data having a high access frequency is located in the storage area of the high-speed storage device, and data having a low access frequency is located in the storage area of the low-speed storage device. This arrangement (namely, tiering) enables the tiered storage system to realize both high performance and low cost.

In order to realize sufficiently effective tiering, it is necessary to appropriately determine an area (tier) in which data is to be located, based on, for example, the frequency of use of the data. In view of this, in the conventional techniques, a storage controller in the tiered storage system manages the count of accesses to each area (for example, a logical area), using an access count table. Based on the access count table, the storage controller relocates data in a logical area having a large access count to the high-speed storage device, and relocates data in a logical area having a small access count to the low-speed storage device.

By the way, recent storage systems including the tiered storage system generally have a copy-on-write function. Assume here that in the tiered storage system having its copy-on-write function made effective, an application operable on a computer overwrites new data (second data) in a first position (more specifically, a first relative position) on a first file. Also assume that the first position on the first file is associated with a first logical area, and hence that data (first data) in the first position is stored in the first logical area.

In this case, in accordance with an access request from a file system, the storage controller reads the first data from the first logical area (old area), and writes (i.e., copies) the read first data to a second logical area (new area) as a free area, different from the first logical area. After that, the storage controller writes (overwrites) the second data to the second logical area. That is, the storage controller replaces the copy of the first data with the second data. The above-mentioned series of operations including reading, writing (coping) and writing (overwriting) is called a copy-on-write operation.

The application recognizes that the second data has been overwritten (written) to the data (first data) in the first position on the first file, regardless of the copy-on-write operation. However, in the copy-on-write operation, the second data is written to a new area different from the copy destination of the first data, i.e., the old area storing the first data. In this case, the storage controller records an access count associated with accesses to the first position on the first file so that the access count is divided into an access count associated with accesses to the old area, and an access count associated with accesses to the new area. As a result, it is possible, for example, that even data, which is to be located in the high-speed storage device in view of a file access status, will be located in the low-speed storage device, which may reduce user's convenience.

BRIEF DESCRIPTION OF THE DRAWINGS

FIG. 1 is a block diagram showing an exemplary hardware configuration of a tiered storage system according to a first embodiment;

FIG. 2 is a block, diagram showing an exemplary functional configuration of the tiered storage system shown in FIG. 1;

FIG. 10 is a block diagram showing an exemplary functional configuration of a tiered storage system according to a second embodiment;

FIG. 14 is a flowchart showing an exemplary procedure of entry addition/update processing included in the daemon processing shown in FIG. 13;

FIG. 18 is a block diagram showing an exemplary functional configuration of a tiered storage system according to a third embodiment;

FIG. 23 is a flowchart showing an exemplary procedure of second table management processing in the third embodiment;

FIG. 25 is a view showing an example of the file-LBA table to which an entry has been added by the first table management processing;

FIG. 26 is a view showing an example of the count table to which an entry has been added by the second table management processing;

FIG. 27 is a view showing examples of changes in the content of a count table in the third embodiment;

FIG. 28 is a view showing an example of the file-LBA table in which the content of a logical address (LBA) list in the entry has been updated by the first table management processing;

FIG. 29 is a view showing an example of count correction information generated by the count correction processing;

FIG. 30 is a view showing an example of the access count table in the third embodiment;

FIG. 31 is a view showing a corrected content example of the access count table in the third embodiment;

FIG. 32 is a block diagram showing an exemplary functional configuration of tiered storage system according to a modification of the third embodiment;

FIG. 35 is a flowchart showing an exemplary procedure of first snap shot management processing in the modification of the third embodiment.

DETAILED DESCRIPTION

Figures 3, 4, 5:
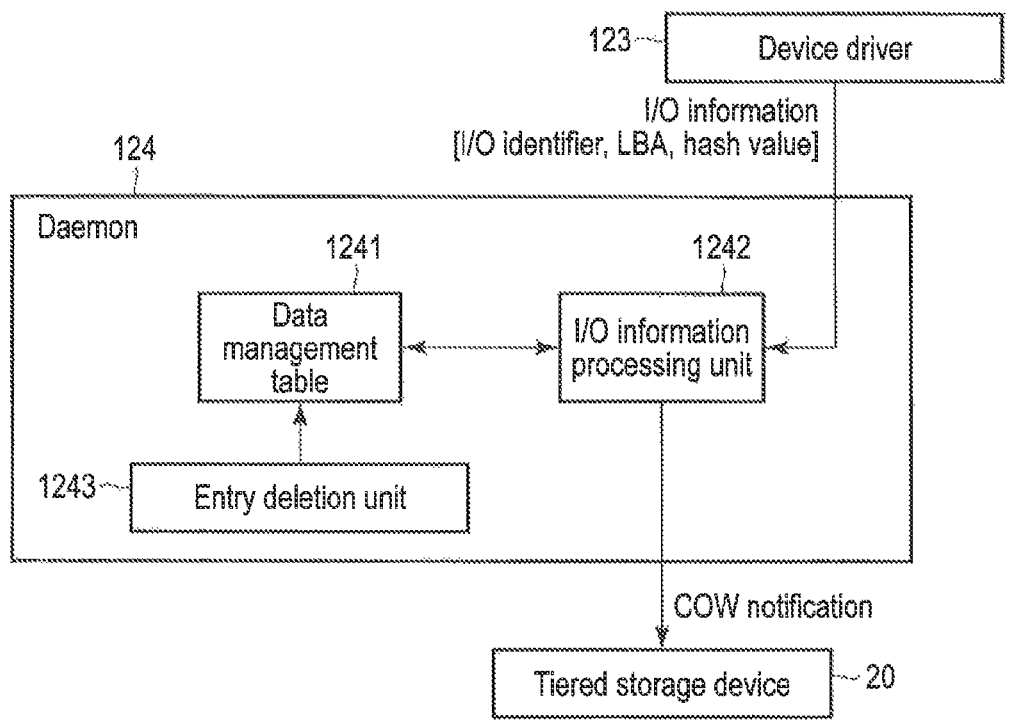
FIG. 3 is a block diagram showing an exemplary functional configuration of a daemon shown in FIGS. 1 and 2.
FIG. 4 is a view showing a data structure example of an access count table shown in FIG. 2.
FIG. 5 is a view showing a data structure example of a data management table shown in FIG. 3.

Various embodiments will be described hereinafter with reference to the accompanying drawings.

In general, according to one embodiment, a tiered storage system includes a tiered storage device and a computer. The computer uses the tiered storage device. The tiered storage device includes a plurality of storage devices having different access performance and a storage controller, and a storage controller controlling accesses to the storage devices. The storage controller manages counts of accesses to logical blocks in a logical unit, to which storage areas of the storage devices are allocated block by block, in association with logical block addresses indicating the logical blocks. The storage controller relocates, to one of the storage devices, data stored in the logical blocks, based on access counts associated with the respective logical block addresses. The computer includes a file system and a device driver. The file system issues a read request or a write request including a logical block address associated with a to-be-accessed block, in accordance with an access request issued from an application operating on the computer and including a filename and relative position information. The relative position information indicates the relative position of the to-be-accessed block included in a file indicated by the filename. The device driver accesses the tiered storage device by sending, to the storage controller, the read request or the write request from the file system. One of the computer and the tiered storage device further includes a correction support unit which supports correction of the access counts managed by the storage controller. The file system manages a file, requested by the application, by associating relative positions, in the file, of blocks constituting the file, with logical block addresses of logical blocks storing data of the blocks constituting the file, and performs, using the device driver, a copy-on-write operation when the access request is a write request WR which requests overwriting of data. The copy-on-write operation includes copying to-be-overwritten data from a first logical block storing the to-be-overwritten data to a second logical block different from the first logical block, and then writing, to the second logical block, data designated by the write request WR. The correction support unit causes the storage controller to carry over an access count managed by the storage controller and associated with a logical block address indicating the first logical block as a copy source in the copy-on-write operation, to an access count associated with a logical block address indicating the second logical block as a copy destination in the copy-on-write operation.

First Embodiment

FIG. 1 is a block diagram showing an exemplary hardware configuration of a tiered storage system according to a first embodiment. The tiered storage system shown in FIG. 1 includes n computers 10_1 to 10_n, and a tiered storage device 20. Computers 10_1 to 10_n each function as a host computer that uses the tiered storage device 20 as their own storage device. FIG. 1 only shows the configuration of computer 10_1 included in computers 10_1 to 10_n. However, the other (n-1) computers including computer 10_n have the same configuration as computer 10_1.

Computer 10_1 includes a CPU 11, a main memory 12, an HDD 13 and a host interface (HI) controller 14. The CPU 11, the main memory 12, the HDD 13 and the HI controller 14 are connected by a system bus 15. For increasing the speed of processing, computer 10_1 may include a plurality of CPUs including the CPU 11.

The main memory 12 is used to store an operating system (OS) 121, an application 122, a device driver 123 (more specifically, a device driver program), a daemon 124 (more specifically, a daemon process program), etc. The OS 121, the application 122, the device driver 123 and the daemon 124 are stored in, for example, the HDD 13, and are loaded for use from the HDD 13 into the main memory 12.

The HI controller 14 controls data transfer between computer 10_1 and a storage controller 23 incorporated in the tiered storage device 20. The HI controller 14 sends, to the storage controller 23, an access request from the device driver 123 based on an access request from the application 122. The HI controller 14 receives, from the storage controller 23, a response (return value) to the access request from the device driver 123, and returns the response to the device driver 123.

The tiered storage device 20 is connected to computers 10_1 to 10_n through a host interface bus 30. Alternatively, the tiered storage device 20 may be connected to computers 10_1 to 10_n through a network, such as a Storage Area Network (SAN). Further, the tiered storage device 20 may be only connected to computer 10_1. That is, the tiered storage device 20 may be used only by computer 10_1.

The tiered storage device 20 includes a plurality of storage devices having different access performance, such as a high-speed storage device 21 and a low-speed storage device 22, and the above-mentioned storage controller 23. The storage controller 23 is connected to the high-speed storage device 21 and the low-speed storage device 22 through a storage interface bus 24.

The high-speed storage device 21 includes a flash storage device, such as a flash array, excellent in access performance (namely, a storage device having a high access speed). The flash storage device is realized using a plurality of flash memory boards. Each flash memory board includes a set of flash memories. In the first embodiment, assume that each flash memory board is incompatible with a hard disk drive (HDD). However, a plurality of solid-state drives (SSDs) that are compatible with the HDD may be used instead of the lash memory boards.

In contrast, the low-speed storage device 22 includes, for example, an array of hard disk drives (HDDs) having a lower access performance (i.e., having a low access speed) than the high-speed storage device 21. The HDD array is, for example, a storage device of a RAID (Redundant Arrays of Inexpensive Disks or Redundant Arrays of Independent Disks) configuration equipped with a plurality of HDDs. The HDD array may include high-speed HDDs, such as HDDs for fibre channel (FC), or low-speed HDDs, such as HDDs for serial ATA (SATA).

In addition, the high-speed storage device 21 and the low-speed storage device 22 are not always required to have an array configuration. Furthermore, the high-speed storage device 21 may include at least one high-speed HDD, and the low-speed storage device 22 may include at least one low-speed HDD. The low-speed storage device 22 may include an optical disk drive, such as a Blu-ray Disc (registered trademark) drive, a DVD (registered trademark) drive, or a tape device. Yet further, when the low-speed storage device 22 includes a tape device, the high-speed storage device 21 may include an optical disk drive.

FIG. 2 is a block diagram showing an exemplary functional configuration of the tiered storage system shown in FIG. 1. As shown in FIG. 2, the OS 121 performs corresponding services upon receiving a read system call or a write system call issued in accordance with a read request or a write request from the application 122. The mechanism for issuing such system calls is called a library (library function) or a jacket library. The OS 121 has a copy-on-write (COW) function.

The OS 121 includes a file system 1210. The file system 1210 associates a file, which is used by applications including the application 122, with a position in the logical space (hereinafter, referred to as a logical unit) of blocks constituting the file and each having a certain size. The logical unit is also called a logical disk or logical volume. The size of each block is used for the file system 1210 to manage the logical unit. That is, the file system 1210 divides the logical unit into a plurality of blocks (logical blocks), and manages the state of use of the logical unit block by block (block size by block size). Moreover, the file system 1210 manages free blocks in the logical unit.

Logical block addresses are sequentially allocated to blocks in the logical unit, beginning with a leading block. On the other hand, numerical values called offsets are sequentially allocated to blocks in a file beginning with a leading block. That is, the offsets allocated to the blocks in the file represent the relative positions of the blocks in the file.

Assume here that file F used by the application 122 includes 2m locks BLK0 to BLK2m−1, and that blocks BLK0 to BLK2m−1 are stored in an area (logical area) of the logical unit designated by logical block addresses LBAa to LBAa+2m−1. In this case, the application 122 recognizes file F from filename F1, offset OFST0, and file size FS of file F, regardless of the storage location of file F. The value of offset OFST0 is 0, and indicates leading block BLK0 of file F. File size FS indicates the number 2m of the blocks of file F.

In contrast, the file system 1210 manages file F by associating, with each other, filename F1, offsets OFST0 (=0) to OFST2m−1 (=2m−1) of blocks BLK0 to BLK2m−1, and logical block addresses LBAa to LBAa+2m−1. In addition, the file system 1210 may manage file F by associating, with each other, filename F1, offset OFST0 (=0), file size FS (=2m), logical block address LBAa of leading block ELK0.

Assume here that m blocks BLK0 to BLKm−1 in file F are stored in an area of the logical unit designated by logical block addresses LBAa to LBAa+m−1. Assume also that remaining m blocks BLKm to BLK2m−1 in file F are stored in an area of the logical unit designated by logical block addresses LBAb to LBAb+m−1.

In this case, for management, the file system 1210 may divide file F into a set of blocks BLK0 to BLKm−1 (hereinafter, referred to as extent EXT0), and a set of blocks BLKm to BLK2m−1 (hereinafter, referred to as extent EXT1). That is, the file system 1210 may manage extent EXT0 by associating, with each other, filename F1, offset OFST0 (=0) of leading block BLK0 of extent EXT0, size ES0 (=m) of extent EXT0, and logical block address LBAa of block BLK0. Similarly, the file system 1210 may manage extent EXT1 by associating, with each other, filename F1, offset OFSTm (=m) of leading block BLKm of extent EXT1, size ES1 (=m) of extent EXT1, and logical block address LBAb of block BLKm.

The device driver 123 is realized when the CPU 11 executes a device driver program. The device driver 123 performs communication (data transfer) between the OS 121 and peripheral devices under control of the OS 121. In particular, the device driver 123 accesses the tiered storage device 20 by sending thereto a read or write request through the HI controller 14 shown in FIG. 1, in response to a request from the file system 1210 in the OS 121. In the first embodiment, assume that the length of data designated by the read or write request is one block. That is, in the first embodiment, a read or write request block by block is assumed.

Further, the device driver 123 passes, to the daemon 124, input/output (I/O) information associated with access (access block by block) to the tiered storage device 20, in accordance with the access. The I/O information includes an I/O identifier indicating the type of I/O (access), and the logical block address (LBA) of an access destination and hash value. The hash value is calculated based on data read from or written to the access destination. For instance, a hash function, such as SHA-256, is used to calculate the hash value. If an arbitrary length of data is designated by a read or write request, it is sufficient if information indicating the length (the number of blocks) of the data is added to the I/O information.

The daemon 124 is realized when the CPU 11 shown in FIG. 1 executes a daemon process program, and functions as a correction support unit that supports correction of an access count managed by the storage controller 23. The function of the daemon 124 will be described later.

The storage controller 23 includes an access count table 230. The access count table 230 includes entries associated with logical block addresses. Each of the entries is used to hold a corresponding logical block address and count (access count). The count indicates the number of accesses to a block designated by the corresponding logical block address, and is called an access frequency or an access statistics value.

Based on counts held in the respective entries of the access count table 230, the storage controller 23 allocates blocks (physical blocks) in the high-speed storage device 21 or the low-speed storage device 22 to blocks (logical blocks) designated by logical block addresses corresponding to the respective entries. Specifically, the storage controller 23 preferentially allocates blocks in the high-speed storage device 21 to blocks of the logical unit which have large access counts. The blocks having large access counts refer to, for example, a certain number of blocks having larger access counts. If the number of blocks having access counts larger than a reference value (namely, a threshold) does not exceed the certain number, the blocks having large access counts may include blocks having access counts smaller than the threshold. Moreover, the storage controller 23 allocates blocks in the low-speed storage device 22 to the remaining blocks (namely, blocks having smaller access counts) in the logical unit.

Assume here that the status of access to a first logical block in the logical unit is changed, and therefore that a physical block allocated to the first logical block is changed from a first physical block in the high-speed storage device 21 to a free second physical block in the low-speed storage device 22, or from a third physical block in the low-speed storage device 22 to a free fourth physical block in the high-speed storage device 21. In this case, the storage controller 23 relocates (transfers) data from the first physical block to the second physical block, or from the third physical block to the fourth physical block. The tiered storage device 20 is dynamically tiered by this relocation.

FIG. 3 is a block diagram showing an exemplary functional configuration of the daemon 124 shown in FIGS. 1 and 2. The daemon 124 includes a data management table 1241, an I/O information processing unit 1242, and an entry deletion unit 1243. When an I/O identifier in I/O information transferred from the device driver 123 to the daemon 124 indicates "read," the I/O information processing unit 1242 adds an entry to the data management table 1241. The data management table 1241 is physically held in a memory area that can be accessed by the daemon 124. The memory area may exist either in the main memory 12 or in a memory other than the main memory 12. The data structure of the data management table 1241 will be described later.

Based on the I/O information transferred from the device driver 123, the I/O information processing unit 1242 adds an entry to the data management table 1241, searches the data management table 1241 for an entry, and updates the information of the detected entry. The update of the information of the detected entry includes not only change of old information to new information, but also setting (addition) of new information in a blank field of the detected entry. Further, the I/O information processing unit 1242 detects a COW operation, based on the I/O information from the device driver 123 and the data management table 1241. This detection will now be described roughly.

First, assume that when the COW function of the OS 121 is effective, the application 122 has issued, to the OS 121, a write request WR to instruct overwriting data D2 in a first file. In this case, for performing a COW operation according to the write request WR, the OS 121 decomposes the write request WR into a read request RR and write request (first write request) WR1, and write request (second write request) WR2.

The read request RR instructs reading, from a first logical area (old area), data in the first file. Assume that data D1 is stored in the first logical area. In this case, write request WR1 instructs writing (copying) data D1, read from the first logical area, to a free second logical area (new area) different from the first logical area. Write request WR2 instructs overwriting the copy in the second logical area with data D2 designated by the write request WR.

Next, the OS 121 controls the device driver 123 to make the tiered storage device 20 sequentially execute read access, first write access and second write access designated by the read request RR, first write request WR1 and second write request WR2, respectively. The I/O information processing unit 1242 detects a series of such read, write and write operations, based on the I/O information from the device driver 123 and the data management table 1241, thereby detecting the COW operation.

Upon detecting the COW operation, the I/O information processing unit 1242 notifies the tiered storage device 20 of the first and second LBAs (namely, old and new LBAs) of the first and second logical areas. This notification will hereinafter be referred to as a COW notification.

The entry deletion unit 1243 deletes, from the data management table 1241, an entry that satisfies either a first or second condition. The entry coinciding with the first condition refers to an entry that is held in the data management table 1241 for a certain period after it is added. The entry coinciding with the second condition refers to an entry that is held in the data management table 1241 for the certain period after its content is updated. Assume that the certain period is determined from the result of execution, by, for example, computer 10_1, of a particular command for measuring I/O response performance associated with access to the tiered storage device 20.

FIG. 4 shows a data structure example of the access count table 230 shown in FIG. 2. In the example of FIG. 4, the access count table 230 includes entry 400. Each of the entries of the access count table 230 including entry 400 includes fields 411 and 412.

Field 411 is an LBA field used to hold an LBA. Field 412 is a count field used to hold the count of accesses to an area (block) indicated by the LBA currently held in field 411. In the example of FIG. 4, fields 411 and 412 of the entry 400 hold 1 (LBA=1) and 100 (count=100), respectively.

FIG. 5 shows a data structure example of the data management table 1241 shown in FIG. 3. Each entry of the data management table 1241 includes fields 511 to 513. Field 511 is an old-LBA field used to hold an LBA in I/O information as old LBA when an entry including field 511 is added to the data management table 1241 based on the I/O information.

Field 512 is a hash-value field used to hold the hash value of data read from an area indicated by the old LBA held in field 511. Field 513 is a new-LBA field used to hold, as new LBA, the LBA of the copy destination of data read from an area indicated by the old LBA.

Figure 6:
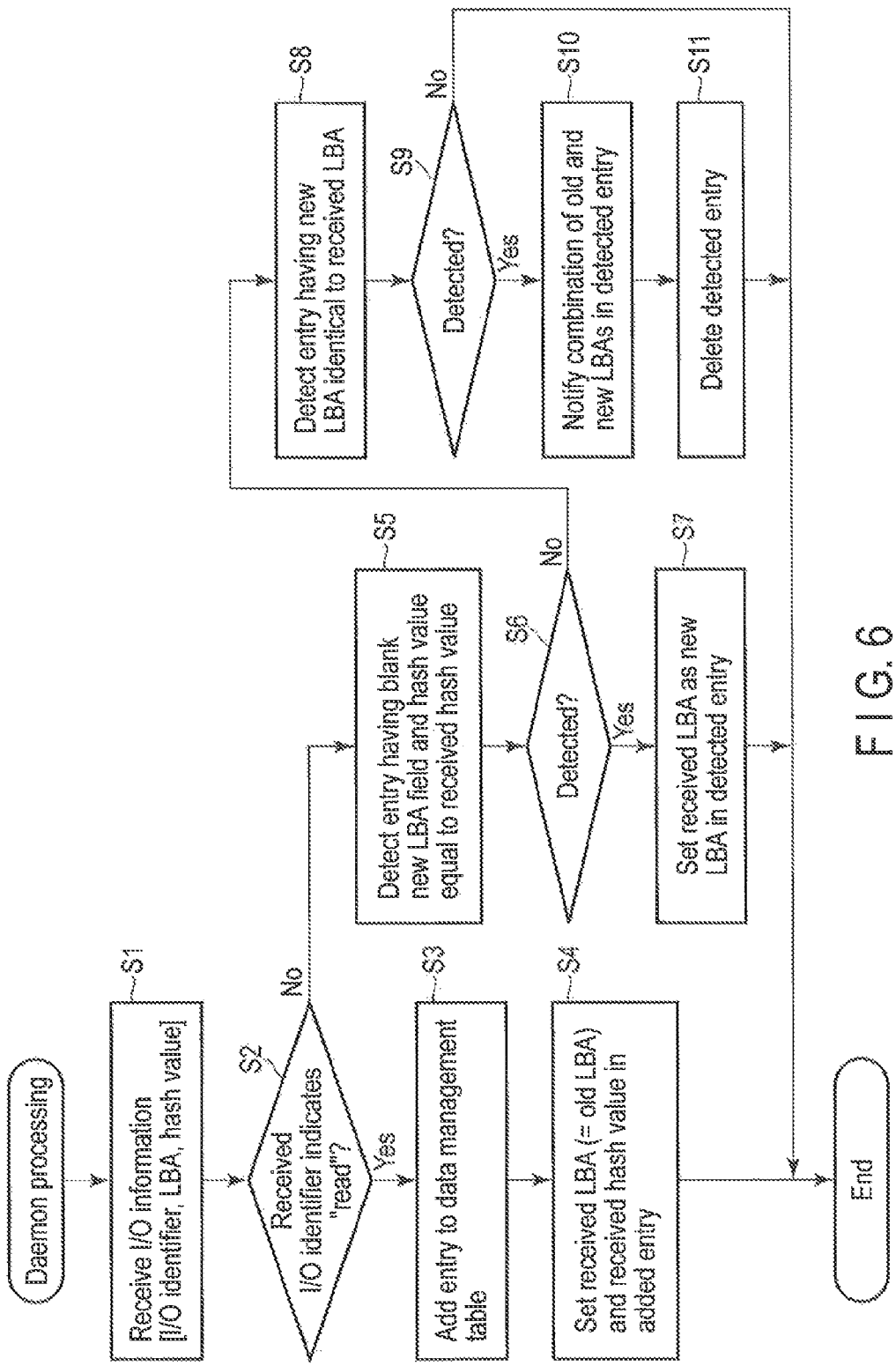
FIG. 6 is a flowchart showing an exemplary procedure of daemon processing in she first embodiment.

Referring then to FIG. 6, a description will be given of daemon processing performed by the daemon 124 in the first embodiment. FIG. 6 is a flowchart showing an exemplary procedure of the daemon processing.

The device driver 123 sends, to the tiered storage device 20, a read request or a write request in accordance with an access request (read or write request) from the OS 121. The device driver 123 passes, to the daemon 124, I/O information corresponding to the read or write request to the tiered storage device 20.

At this time, the I/O information processing unit 1242 of the daemon 12 starts daemon processing as indicated by the flowchart of FIG. 6. First, the I/O information processing unit 1242 receives the I/O information from the device driver 123 (step S1). The I/O information includes an I/O identifier, a logical block address (LBA) and a hash value. That is, the I/O information processing unit 1242 receives the I/O identifier, LBA and hash value.

Next, the I/O information processing unit 1242 determines whether the received I/O identifier indicates "read" (step S2). If the received I/O identifier indicates "read" (Yes in step S2), the I/O information processing unit 1242 proceeds to step S3.

In step S3, the I/O information processing unit 1242 adds one entry to the data management table 1241 (step S3). Assume that when the entry is added, fields 511 to 513 of the entry are blank. After that, the I/O information processing unit 1242 sets the received LBA and hash value in field (old-LBA field) 511 and field (hash-value field) 512 of the added entry, respectively (step S4), thereby completing the daemon processing.

In step S3, the I/O information processing unit 1242 may add, to the data management table 1241, entry 500 including fields 511 and 512 where the received LBA and hash value are set. In this case, step S4 is unnecessary.

In contrast, if the received I/O identifier does not indicate "read" (i.e., if the received I/O identifier indicates "write") (No in step S2), the I/O information processing unit 1242 proceeds to step S5. In step S5, the I/O information processing unit 1242 searches the data management table 1241 for an entry, as a target entry, which has blank field 513 and field 512 having a hash value equal to the received hash value. After that, the I/O information processing unit 1242 determines whether the target entry has been detected (step S6).

If the target entry has been detected (Yes in step 36), the I/O information processing unit 1242 sets the received LBA in field 513 of the detected entry as a new LBA (step S7). Then, the I/O information processing unit 1242 completes the daemon processing.

In contrast, if the target entry has not been detected (No in step S6), the I/O information processing unit 1242 searches the data management table 1241 for an entry, as the target entry, in which the content (new LBA) of field 513 is identical to the received LBA (step S8). The I/O information processing unit 1242 determines whether the target entry has been detected (step S9).

If the target entry has been detected (Yes in step S9), the I/O information processing unit 1242 executes a COW notification. That is, the I/O information processing unit 1242 notifies the tiered storage device 20 of the content (namely, the old LBA and new LBA) of fields 511 and 513 of the detected entry (step S10).

Next, the I/O information processing unit 1242 deletes the detected entry from the data management table 1241 as an entry that satisfies the third condition (step S11). The entry that satisfies the third condition refers to an entry including the old LBA and new LBA notified to the tiered storage device 20 from the I/O information processing unit 1242. After executing step S11, the I/O information processing unit 1242 completes the daemon processing. The entry deletion unit 1243 may delete the detected entry. On the other hand, if the target entry has not been detected (No in step S9), the I/O information processing unit 1242 finishes the daemon processing immediately.

Figure 7:
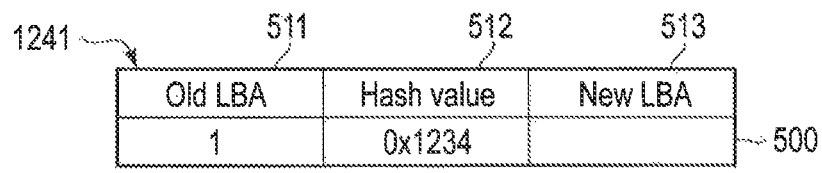
FIG. 7 is a view showing an example of the data management table to which en entry has been added by the daemon processing.
Figure 8:
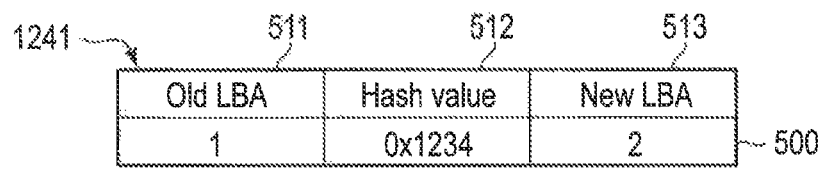
FIG. 8 is a view showing an example of the data management table wherein the entry content has been updated by the daemon processing.
Figure 9:
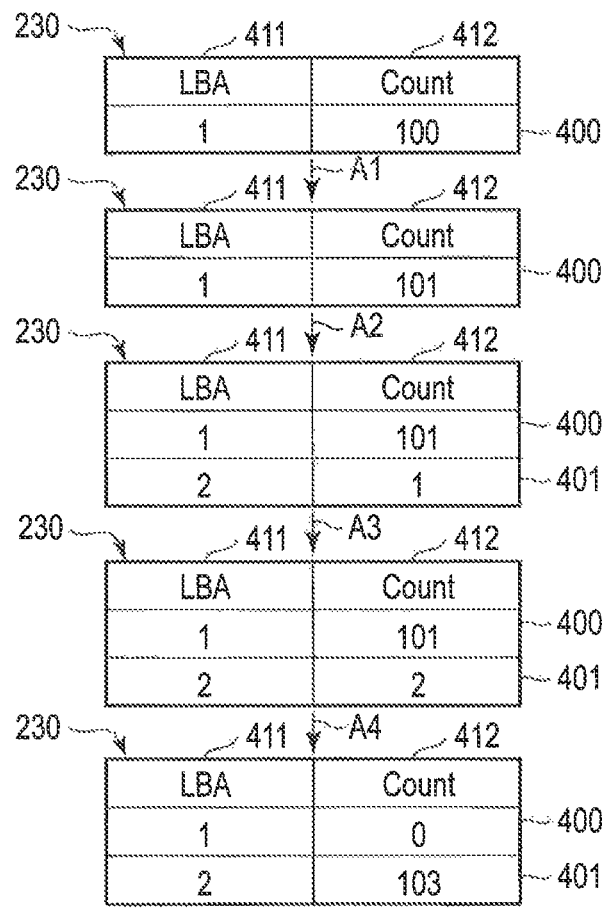
FIG. 9 is a view showing examples of changes in the content of the access count table in the first embodiment.

Referring now to FIGS. 7 to 9 in addition to the flowchart of FIG. 6, a description will be given of a specific example of the daemon processing in the first embodiment. FIG. 7 shows an example of the data management table 1241 to which an entry has been added by the daemon processing, and FIG. 8 shows an example of the data management table 1241 in which entry content has been updated by the daemon processing. FIG. 9 shows examples of changes in the content of the access count table 230.

Assume first that the application 122 has issued a write request WR to request overwriting, with data D2, of offset OFSTi in already existing file F. In accordance with the write request WR a write system call issuance mechanism issues a write system call to the OS 121. The write request WR and write system call include file information associated with a position (write position) in file F, to which data D2 (one-block data in the first embodiment) is to be written.

The file information includes filename F1 of file F and offset OFSTi in the first embodiment where a read or write request made block by block is applied. Offset OFSTi indicates the i-th offset (OFSTi=i). In this case, the file information indicates that a write (access) position is the i-th offset (position of the i-th block) in file F indicated by filename F1. Therefore, the write request WR and write system call including such file information designate overwriting the i-th offset in file F with data.

The file information may include data indicating data size DS. In the above-described example, data size DS is one (one block). If reading or writing of data in an arbitrary number j of blocks is performed, data size DS is j (j blocks). In this case, the write position ranges from i-th offset OFSTi (block BLKi) to (i+j−1)-th offset OFSTi+j−1 (block BLKi+j−1) in file F.

The write system call is received by the file system 1210 of the OS 121. The file system 1210 starts a COW operation based on the write system call (write request WR). First, the file system 1210 decomposes the write system call (write request WR) into a read request RR, it write request WR1 and second write request WR2. After that, the file system 1210 causes the device driver 123 to send the read request RR to the tiered storage device 20. The read request FR includes address LBAp (namely, logical block address) of a logical block that stores the data (block data) of block BLKi at a position in file F, indicated by offset OFSTi. That is, the read request RR instructs reading of data from the logical block designated by logical block address LBAp. LBAp is, for example, 1.

In accordance with the read request RR from the device driver 123, the storage controller 23 of the tiered storage device 20 reads data designated by the read request RR, as follows: First, the storage controller 23 translates logical block address LBAp (LBA=LBAp=1), designated by the read request RR, into physical address PAp allocated to logical block address LBAp, using an address translation table. Physical address PAp includes a tier identifier that designates the high-speed storage device 21 or the low-speed storage device 22. The storage controller 23 reads data D1 from the high-speed storage device 21 or the low-speed storage device 22, based on physical address PAp.

Assume that the access count table 230 is in a state shown in FIG. 4 before data D1 is read. That is, assume that fields 411 and 412 of the access count table 230 hold 1 (LBA=1) and 100 (count=100), respectively. In this case, in accordance with the read of data D1, the storage controller 23 increments, by one, the content (count) of field 412 of entry 400 in the access count table 230, which includes logical block address LBAp to which physical address PAp is allocated. As a result, the count (access count) of field 412 of entry 400 is incremented from 100 shown in FIGS. 4 to 101 as indicated by arrow A1 in FIG. 9.

Further, the storage controller 23 sends read data D1 to the device driver 123. The device driver 123 sends read data D1 to the file system 1210 as a response (return value) to the read request RR from the file system 1210.

Moreover, the device driver 123 calculates hash value H1 of data D1. After that, the device driver 123 generates I/O information corresponding to the read request RR. The I/O information corresponding to the read request PR includes an I/O identifier indicating "read," logical, block address LBAp (LBA=LBAp) and hash value H1. The device driver 123 passes the I/O information [I/O identifier=read, LBAp, H1] to the daemon 124.

At this time, the I/O information processing unit 1242 of the daemon 124 executes daemon processing in accordance with the flowchart of FIG. 6, as described below. First, the I/O information processing unit 1242 receives the I/O information [I/O identifier=read, LBAp, H1] from the device driver 123 (step S1). Assume here that LBAp and H1 in the I/O information are 1 and 0×1234, respectively. Sign O× in 0×1234 represents that subsequent 1234 is of a hexadecimal notation.

If the received I/O identifier represents "read" as mentioned above (Yes in step S2), the I/O information processing unit 1242 adds one entry to the data management table 1241 (step S3). FIG. 7 shows an example of the data management table 1241, in which entry 500 is added. When entry 500 has been added, fields 511 to 513 of entry 500 are blank.

Next, the I/O information processing unit 1242 sets LBA and H1 in the received I/O information, i.e., received LBAp (=1) and received hash value H1 (=0×1234), in filed (old-LBA field) 511 and field (hash-value field) 512 of entry 500, respectively (step S4). Then, the I/O information processing unit 1242 completes the daemon processing.

On the other hand, upon receiving a response to the read request RR, the file system 1210 causes the device driver 123 to send write request WR1 to the tiered storage device 20. Write request WR1 includes logical block address LBAq of a free logical block, and instructs writing (i.e., copying) data D1, read in accordance with the read request RR, to the free logical block designated by logical block address LBAq.

The device driver 123 generates I/O information corresponding to write request WR1 when it sends write request WR1 to the tiered storage device 20. The I/O information corresponding to write request WR1 includes an I/O identifier indicating "write," logical block address LBAq (LBA=LBAq), and hash value H2. LBAq is, for example, 2. Hash value H2 is calculated based on data D1 read in accordance with the read request RR. Accordingly, hash value H2 is 0×1234 that is equal to hash value H1 in the I/O information corresponding to the read request RR. The device driver 123 passes the I/O information [I/O identifier write, LBAq, H2] to the daemon 124.

At this time, the I/O information processing unit 1242 of the daemon 124 re-executes the daemon processing indicated by the flowchart of FIG. 6. First, the I/O information processing unit 1242 receives the I/O information [I/O identifier=write, LBAq, H2] from the device driver 123 (step S1).

When the received I/O identifier indicates "write" as described above (No in step S2), the I/O information processing unit 1242 proceeds to step S5. In step S5, the I/O information processing unit 1242 searches the data management table 1241 for an entry, as a target entry, in which field 513 is blank, and the content of field 512 is equal to received hash value H2 (=0×1234).

If the received I/O information is I/O information corresponding to write request WR1, the I/O information processing unit 1242 can detect entry 500 shown in FIG. 7 as the target entry (Yes in step S6). In this case, the I/O information processing unit 1242 determines that the received I/O information corresponds to a write request (WR1) that instructs writing (i.e., copying), to a second logical area (block) designated by LBAq in the received I/O information, data (D1) read from a first logical area (block) designated by the LBA (old LBA=LBAp=1) set in field 511 of entry 500. That is, the I/O information processing unit 1242 determines that the received I/O information corresponds to a first write request (WR1) for copying in a COW operation.

Therefore, the I/O information processing unit 1242 sets received LBAq (=2) as a new LBA in field 513 of detected entry 500, as is shown in FIG. 8 (step S7). Then, the I/O information processing unit 1242 completes the daemon processing.

On the other hand, the storage controller 23 of the tiered storage device 20 executes write request WR1 received from the device driver 123, as follows: First, the storage controller 23 translates logical block address LBAq (LBA=LBAq=2) designated by write request WR1 into physical address PAq allocated to logical block address LBAq. Physical address PAq includes a tier identifier that designates the high-speed storage device 21 or the low-speed storage device 22. Based on physical address PAq, the storage controller 23 writes (copies) data D1 to the high-speed storage device 21 or the lowspeed storage device 22.

Assume that at this time, the access count table 230 does not include entry 401 in which logical block address LBAq (=2) is set in field 411. In this state, the storage controller 23 adds, no the access count table 230, entry 401 in which logical block address LBAq (=2) and count 1 are set in fields 411 and 412, respectively, as is indicated by arrow A2 in FIG. 9. The access count table 230 may include, before data D1 is written, an entry (corresponding to entry 401) in which the content of field 411 is identical to logical block address LBAq (=2), and field 412 is blank or the content (count) thereof is zero. In this case, it is sufficient if the storage controller 23 sets 1 in field 412 of this entry.

Moreover, the storage controller 23 returns, to the device driver 123, a response (return value) to write request WR1. Upon receiving a response to write request WR1, the file system 1210 causes the device driver 123 to send write request WR2 to the tiered storage device 20. Write request WR2 includes logical block address LBAq of the second logical block where data D1 has been written (copied) in accordance with write request WR1, and instructs writing (i.e., overwriting), to a logical block designated by logical block address LBAq, data D2 designated by the write request WR (i.e. by the read system call corresponding thereto) from the application 122.

The device driver 123 generates I/O information corresponding to write request WR2 when it sends write request WR2 to the tiered storage device 20. The I/O information corresponding to write request WR2 includes an I/O identifier indicating "write," logical block address LBAq (LBA=LBAq=2), and hash value H3. Hash value H3 is calculated based on data D2 designated by write request WR2. Therefore, hash value H3 is not equal to hash value H1 in the I/O information corresponding to the read request RR.

The I/O information processing unit 1242 of the daemon 124 receives the above-mentioned I/O information [I/O identifier=write, LBAq, H3] from the device driver 123 (step S1). Since in this case, the determination result of step S2 is No, the I/O information processing unit 1242 proceeds to step S5 again.

If the received I/O information corresponds to write request WR2, the I/O information processing unit 1242 cannot detect an entry in which field 513 is blank, and the content of field 512 is equal to received hash value H3 (No in step S6). However, the I/O information processing unit 1242 can detect entry 500 (see FIG. 8) in which the content (new LBA) of field 513 is identical to the received LBA is (=LBAq=2) (Yes in step S9). In this case, the I/O information processing unit 1242 determines that the received I/O information corresponds to a write request (WR2) which instructs overwriting, with new data (D2), data (D1) copied from the first logical area designated by the old LBA (=LBAp=1) to the second logical area designated by the LBA (new LBA=LBAq=2) in the received I/O information. That is, the I/O information processing unit 1242 determines that the received I/O information corresponds to a second write request (WR2) for overwriting in a COW operation, and therefore that the COW operation has been detected.

At this time, the I/O information processing unit 1242 performs a COW notification. That is, the I/O information processing unit 1242 notifies the tiered storage device 20 of information indicating that the data in the first logical area designated by the old LBA (=LBAp=1) has been moved to the second logical area designated by the new LBA (=LBAq=2) as a result of the COW operation (step S10). Specifically, the I/O information processing unit 1242 notifies the tiered storage device 20 of the content of fields 511 and 513 of entry 500 (target entry) as information indicating the combination of the old LBA and the new LBA. Next, the I/O information processing unit 1242 deletes entry 500 from the data management table 1241 (step S11), thereby completing the daemon processing.

On the other hand, the storage controller 23 of the tiered storage device 20 executes write request WR2 when it has received write request WR2 from the device driver 123. That is, the storage controller 23 writes (overwrites) data D2 to the high-speed storage device 21 or the low-speed storage device 22, based on physical address PAq allocated to logical block address LBAq (LBA=LBAq=2) designated by write request WR2. In other words, the storage controller 23 updates, to new data D2, data D1 at the i-th offset in file F, which was copied to the second logical area designated by LBAq.

Further, the storage controller 23 operates entry 401 of the access count table 230, which includes logical block address LBAq (LBA=LBAq=2), in accordance with execution of write request WR2 (overwriting of data D2). That is, the storage controller 23 increments the count in field 412 of entry 401 from 1 to 2 as indicated by arrow A3 in FIG. 9.

Furthermore, the storage controller 23 returns, to the device driver 123, a response (normal completion response) to write request WR2, in accordance with the completion of execution of write request WR2. The file, system 1210 receives the response from the device driver 123. At this time, the file system 1210 finishes the COW operation according to the write request WR, and returns, to the application 122, a response to the write request WR. Moreover, the file system 1210 changes, from LBAp to LBAq, the logical block address associated with the i-th offset in file F. The file system 1210 manages, as a free area, the first logical area designated by LBAp, and manages, as an area in use, the second logical area designated by LBAq.

In the COW operation, while overwriting of data D2 is being performed, original data D1 is stored in the first logical area designated by LBAp. Therefore, even if a failure, such as interruption of power supply, has occurred during the above-mentioned overwriting, the content of the first file can be restored to an original state before the start of the COW operation. That is, the COW operation enables the consistency of data to be maintained even if a failure has occurred.

Thereafter, assume that the storage controller 23 of the tiered storage device 20 has received the above-mentioned COW notification from the device driver 123. This COW notification includes a combination of the old LBA (=LBAp=1) and the new LBA (=LBAq=2). In this case, the storage controller 23 adds the count (=101) of entry 400 of the access count table 230, which includes the old LBA (=1), to the count (=2) of entry 401 of the access count table 230, which includes the new LBA (=2). That is, in accordance with the COW notification from the device driver 123, the storage controller 23 carries over the count (=101) associated with the old LBA (=1) to the count associated with the new LBA (=2) of a copy destination to which data of the old LBA is copied. After that, the storage controller 23 clears the count in entry 400.

Thus, the counts of entries 400 and 401 of the access count table 230 are updated from 101 and 2 to 0 and 103, respectively, as indicated by arrow 14 in FIG. 9. As a result of this update, entry 401 indicates that the count of accesses to the logical area which stores data at the i-t offset in file F (designated by the new LBA (=2)) is 103. That is, entry 401 correctly indicates the number of accesses to the i-th offset in file F recognized by the application 122.

In the first embodiment, also when read request RRs irrelevant to the COW operation has been issued from the file system 1210 to the device driver 123, an entry is added to the data management table 1241 (step S3). However, a write request for copying corresponding to read request RRs is not issued from the file system 1210 to the device driver 123. Therefore, when entry Es has been added to the data management table 1241 at time Ts, based on I/O information corresponding to read request RRs, the entry deletion unit 1243 deletes entry Es in accordance with elapse of the certain period from time Ts (establishment of the first condition).

Moreover, in the first embodiment, even when write request WRt for copying a file irrelevant to the COW operation has been issued from the file system 1210 to the device driver 123, the content of the entry added to the data management table 1241 (more specifically, the content of field 513) is updated (step S7). However, no write request for overwriting corresponding to write request WRt is issued from the file system 1210 to the device driver 123. Therefore, when entry Et in the data management table 1241 has been updated at time Tt, based on I/O information corresponding to write request WRt, the entry deletion unit 1243 deletes entry Et in accordance with elapse of the certain period from time Tt (establishment of the second condition).

In order to perform the above-mentioned entry erasure, it would be advisable to add, to each entry of the data management table 1241, a field for setting time information.

The time information represents a time and date where a corresponding entry has been added or the content of the entry has been updated.

Next, assume that write request WRu for writing new data irrelevant to the COW operation has been issued from the file system 1210 to the device driver 123. There is no read request corresponding to write request WRu. In this case, the answers to steps S2, S6 and S9 are all No, and therefore, I/O information corresponding to write request WRu is discarded.

In the first embodiment, the daemon 124 (more specifically, the I/O information processing unit 1242 in the daemon 124) processes I/O information from the device driver 123, thereby detecting the COW operation of the file system 1210 in real time, and notifying the tiered storage device 20 of the combination of old and new LBAs associated with the COW operation. This structure enables the storage controller 23 of the tiered storage device 20 to realize tiering that correctly reflects the status of access requests (in particular, a write request for overwriting data in file F) issued by the application 122, even when the COW function of the file system 1210 is effective. That is, in the first embodiment, tiering that contributes to improvement of user's convenience can be realized. Moreover, for realizing this, it is not necessary to change the OS 121 (the file system 1210) and the application 122.

In the first embodiment, the daemon 124 is incorporated in computer 10_1. However, the daemon 124 may be incorporated in the tiered storage device 20. Further, in the first embodiment, the tiered storage device 20 includes two storage devices having different access performance, i.e., the high-speed storage device 21 and the low-speed storage device 22. However, the tiered storage device 20 may include three or more storage devices having different performance. For example, the tiered storage device 20 may include a storage device having access performance lower than the high-speed storage device 21 and higher than the low-speed storage device 22, in addition to the high-speed and low-speed storage devices 21 and 22.

Second Embodiment

A tiered storage system according to a second embodiment will now be described. The tiered storage system of the second embodiment is assumed to have a hardware configuration similar to that of the tiered storage system of the first embodiment. Therefore, for describing the configuration of the tiered storage system of the second embodiment, FIG. 1 will be referred to for convenience. However, the tiered storage system of the second embodiment differs from the system of the first embodiment in the functional configuration of computer 10_1 (to computer **10-*n*). For instance, computer 10_1 in the second embodiment incorporates a daemon 124***a* (see FIG. 10) having a function different from that of the daemon 124 incorporated in computer 10_1 in the first embodiment. Therefore, in the second embodiment, the daemon 124 shown in FIG. 1 may be replaced with the daemon 124*a*, if necessary.

The functional configuration of the tiered storage system of the second embodiment will be described with reference to FIG. 10, with points different from those of the first embodiment mainly focused on. FIG. 10 is a block diagram showing an exemplary functional configuration of the tiered storage system of the second embodiment. Computer 10_1 in FIG. 10 includes a cache controller 125, unlike the computer of FIG. 2.

The cache controller 125 includes a cache buffer 1250. The cache buffer 1250 is used to temporarily store data (read data) read from the tiered storage device 20, and data (write data) to be written to the tiered storage device 20. The cache buffer 1250 may be provided outside the cache controller 125. Data (read data and write data) stored in the cache buffer 1250 is called cache data (read cache data and write cache data).

The cache controller 125 controls storing (writing) of data in (to) the cache buffer 1250 and reading of data from the cache buffer 1250, namely, cache access. The cache controller 125 also manages the directory of data stored in the cache buffer 1250. In FIG. 10, a directory management table used for directory management is omitted.

Further, the cache controller 125 passes, to the daemon 124*a*, I/O information associated with writing of write data to the cache buffer 1230, in accordance with writing of the write data thereto based on a write request from the file system 1210. The I/O information from the cache controller 125 includes the hash value of the write data, and an address (namely, a buffer address) allocated to the write destination of the write data in the cache buffer 1250.

Figures 11, 12:
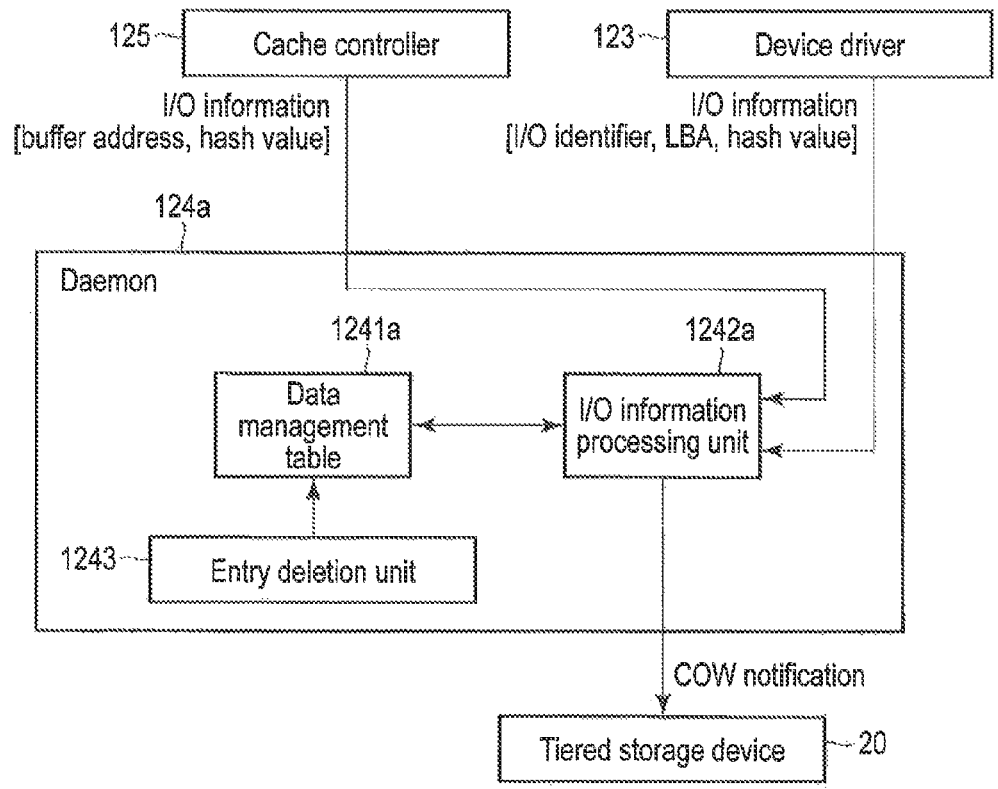
FIG. 11 is a block diagram showing an exemplary functional configuration of a daemon shown in FIG. 10.
FIG. 12 is a view showing a data structure example of a data management table shown in FIG. 11.

FIG. 11 is a block diagram showing an exemplary functional configuration of the daemon 124*a* shown in FIG. 10. The daemon 124*a* includes a data management table 1241*a*, an I/O information processing unit 1242*a*, and an entry deletion unit 1243. The data management table 1241*a* and the I/O information processing unit 1242*a* correspond to the data management table 1241 and the I/O information processing unit 1242 shown in FIG. 3, respectively. However, the data structure of the data management table 1241*a* differs from that of the data management table 1241, and the function of the I/O information processing unit 1242*a* differs from that of the I/O information processing unit 1242.

Eased on the I/O information passed from the device driver 123 or the cache controller 125, the I/O information processing unit 1242*a* executes addition of an entry to the data management table 1241*a*, search of the data management table 1241 for an entry, and update of entry information of a detected entry (more specifically, addition of data to the detected entry). Further, the I/O information processing unit 1242*a* detects a COW operation based on the update of the entry information of the detected entry.

FIG. 12 shows a data structure example of the data management table 1241*a* shown in FIG. 11. Each entry of the management table 1241*a* includes fields C1 to C4. Field C1 is a buffer address field used to hold a buffer address in I/O information from the cache controller 125 when an entry including field C1 has been detected based on the I/O information.

Field C2 is an old-hash-value field used to hold, as an old hash value, a hash value in I/O information from the device driver 123 when an entry including field C2 has been added based on the I/O information-Field C3 is a new-hash-value field used to hold, as a new hash value, a hash value in I/O information from the cache controller 125 when an entry including field C3 has been detected based on a buffer address in the I/O information.

Field C4 is an old-LBA field used to hold, as an old LBA, an LBA in I/O information from the device driver 123 when an entry including field C4 has been added based on the I/O information. Field C5 is a new-LBA field used to hold, as a new LBA, an LBA in I/O information from the device driver 123 when an entry including field C5 has been detected based on the I/O information.

Figure 13:
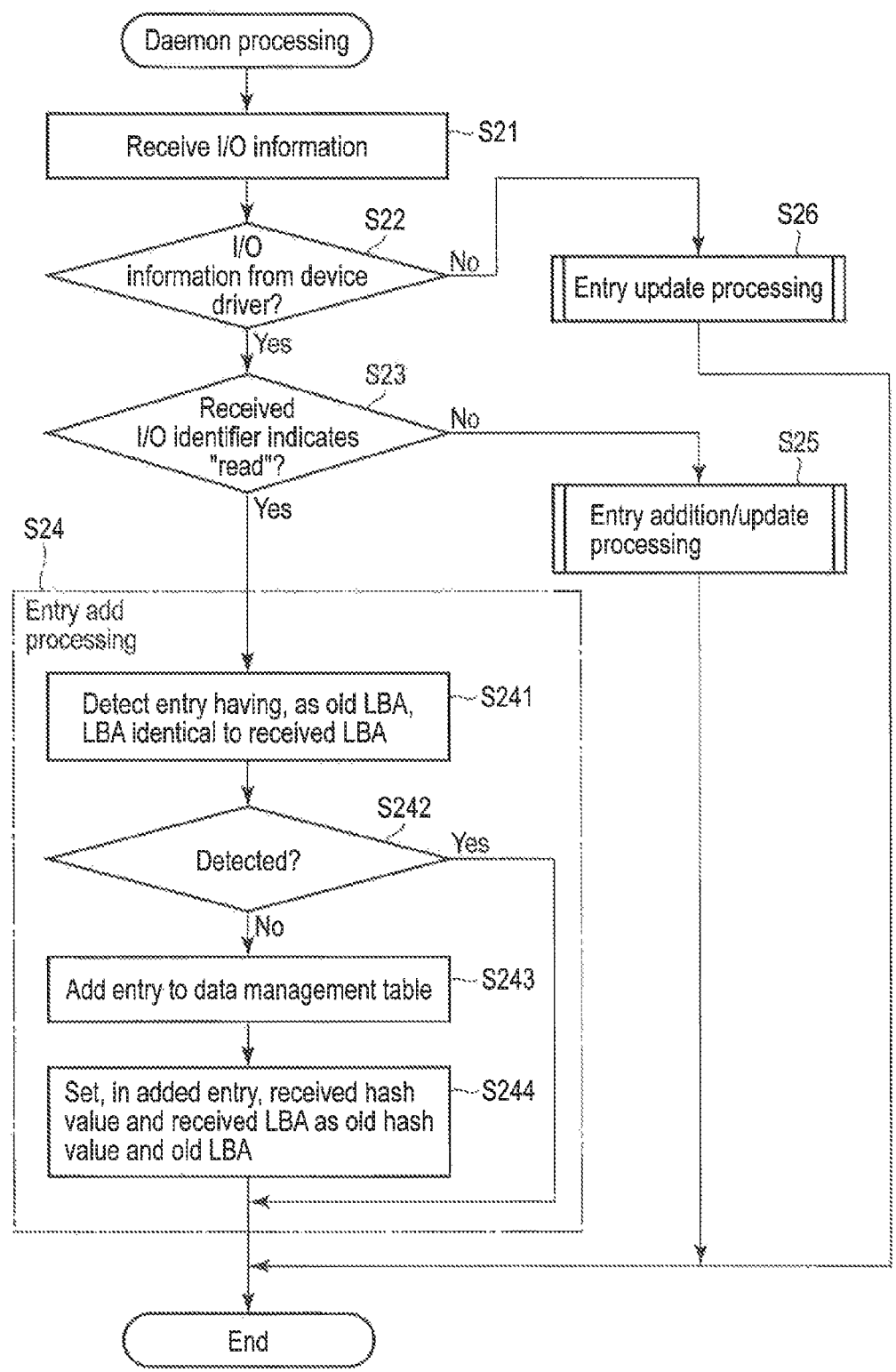
FIG. 13 is a flowchart showing an exemplary procedure of daemon processing in the second embodiment.
Figure 15:
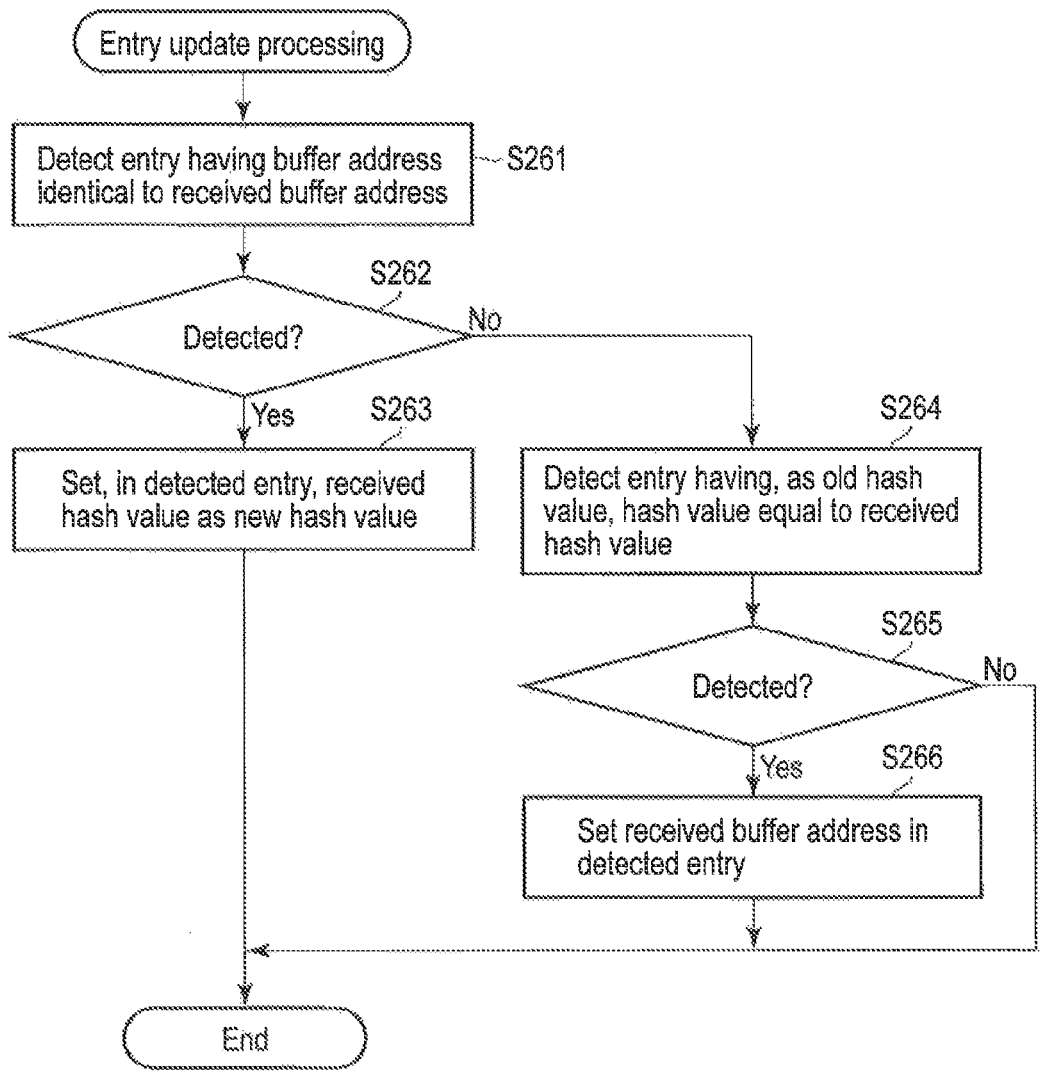
FIG. 15 is a flowchart showing an exemplary procedure of entry update processing included in the daemon processing shown in FIG. 13.

Referring then to FIGS. 13 to 15, a description will be given of daemon processing performed by the daemon 124*a* in the second embodiment. FIG. 13 is a flowchart showing an exemplary procedure of the daemon processing. FIG. 14 is a flowchart showing an exemplary procedure of entry addition/update processing included in the daemon processing of FIG. 13, and FIG. 15 is a flowchart showing an exemplary procedure of entry update processing included in the daemon processing of FIG. 13.

In accordance with writing of write data to the cache buffer 1250 based on a write request from the file system 1210 to the cache controller 125, the cache controller 125 passes, to the daemon 124a, I/O information [hash value, buffer address] associated with the writing. The device driver 123 sends a read or write request to the tiered storage device 20 in accordance with an access request (a read or write request) from the file system 1210. If the device driver 123 sends a read or write request to the tiered storage device 20, it passes, to the daemon 124a, I/O information [I/O identifier=read, LBA, hash value] corresponding to the read or write request.

The I/O information processing unit 1242a of the daemon 124a receives I/O information from the device driver 123 or the cache controller 125 (step S21). After that, the I/O information processing unit 1242a determines whether the received I/O information is I/O information from, for example, the device driver 123 (step S22).

If the answer to step S22 is Yes, the received I/O information includes an I/O identifier, an LBA and a hash value. In this case, the I/O information processing unit 1242a determines whether the received I/O identifier indicates "read" (step S23).

If the answer to step S23 is Yes, the I/O information processing unit 1242a performs entry addition processing (step S24), as follows: First, the I/O information processing unit 1242a searches the data management table 1241a for an entry, as a target entry, which has, as an old LBA, an LBA identical to the received LBA (step S241). Subsequently, the I/O information processing unit 1242a determines whether the target entry has been detected (step S242).

If the answer to step S242 is No, the I/O information processing unit 1242a adds one entry to the data management table 1241a (step S243). When the entry has been added, fields C1 to C5 of the entry are blank. Next, the I/O information processing unit 1242a sets the received hash value and the received LBA as an old hash value and an old LBA in field (old-hash-value field) C2 and field (old-LBA field) C4 of the added entry, respectively (step S244). Thus, the I/O information processing unit 1242 completes the entry addition processing (step S24), thereby completing the daemon processing. In contrast, if the answer to step S242 is Yes, the I/O information processing unit 1242a immediately completes the entry addition processing (step S24), thereby completing the daemon processing.

In contrast, if the answer to step S23 is No, the I/O information processing unit 1242a executes entry addition/update processing (step S25) in accordance with the flowchart shown in FIG. 14, as follows: First, the I/O information processing unit 1242a searches the data management table 1241a for an entry, as a target entry, which has, as an old LBA, an LBA identical to the received LBA (step S251). Subsequently, the I/O information processing unit 1242a determines whether the target entry has been detected (step S252).

If the answer to step S252 is No, the I/O information processing unit 1242a searches the data management table 1241a for an entry, as the target entry, which has, as a new hash value, a hash value equal to the received hash value (step S253). Subsequently, the I/O information processing unit 1242a determines whether the target entry has been detected (step S254).

If the answer to step S254 is No, the I/O information processing unit 1242a adds one entry to the data management table 1241a as in step S243 (step S255). When the entry has been added, fields C1 to C5 of the entry are blank. Next, the I/O information processing unit 1242a sets, as in step S244, the received hash value and the received LBA as an old hash value and an old LBA in fields C2 and C4 of the added entry, respectively (step S256). Then, the I/O information processing unit 1242 completes the entry addition/update processing (step S25), and completes the daemon processing.

In contrast, if the answer to step S254 is Yes, the I/O information processing unit 1242a determines that the COW operation has been detected. Therefore, the I/O information processing unit 1242a sets the received LBA as a new LBA in field C5 of the detected entry (step S257).

Next, the I/O information processing unit 1242a notifies the tiered storage device 20 of the combination of the old and new LBAs set in fields C4 and C5 of the detected entry (step S258). Next, the I/O information processing unit 1242a deletes the detected entry from the data management table 1241a (step S259). Thus, the I/O information processing unit 1242a completes the entry addition/update processing (step S25), thereby completing the daemon processing. The detected entry may be deleted by the entry deletion unit 1243.

Moreover, if the answer to step S22 is No, the received I/O information includes a buffer address and a hash value. In this case, the I/O information processing unit 1242a executes entry update processing (step S26) in accordance with the flowchart shown in FIG. 15, as follows: First, the I/O information processing unit 1242a searches the data management table 1241a for an entry, as a target entry, which has a buffer address identical to the received buffer address (step S261). Subsequently, the I/O information processing unit 1242a determines whether the target entry has been detected (step S262).

If the answer to step S262 is Yes, the I/O information processing unit 1242a sets the received hash value as a new hash value in field C3 of the detected entry (step S263). Thus, the I/O information processing unit 1242a completes the entry update processing (step S26), thereby completing the daemon processing.

On the other hand, if the answer to step S262 is No, the I/O information processing unit 1242a searches the data management table 1241a for an entry, as the target entry, which has, as an old hash value, a hash value equal to the received hash value (step S264). Subsequently, the I/O information processing unit 1242a determines whether the target entry has been detected (step S265).

If the answer to step S265 is Yes, the I/O information processing unit 1242a sets the received buffer address in field C1 of the detected entry (step S266). Thus, the I/O information processing unit 1242a completes the entry update processing (step S26), thereby completing the daemon processing. In contrast, if the answer to step S265 is No, the I/O information processing unit 1242a immediately completes the entry addition processing (step S26), thereby completing the daemon processing.

Figure 16:
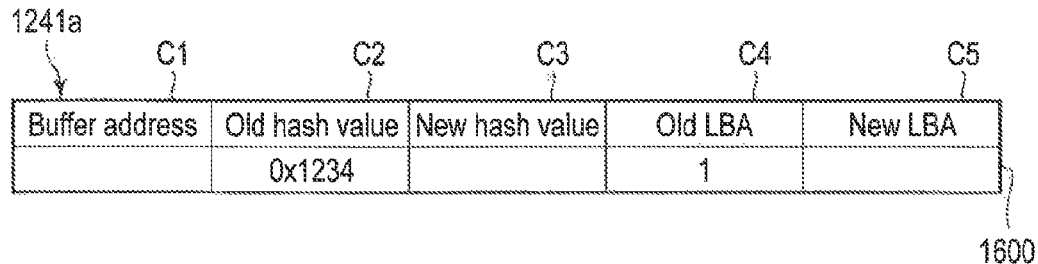
FIG. 16 is a view showing an example of the data management table to which an entry has been added by the daemon processing shown in FIG. 13.
Figure 17:
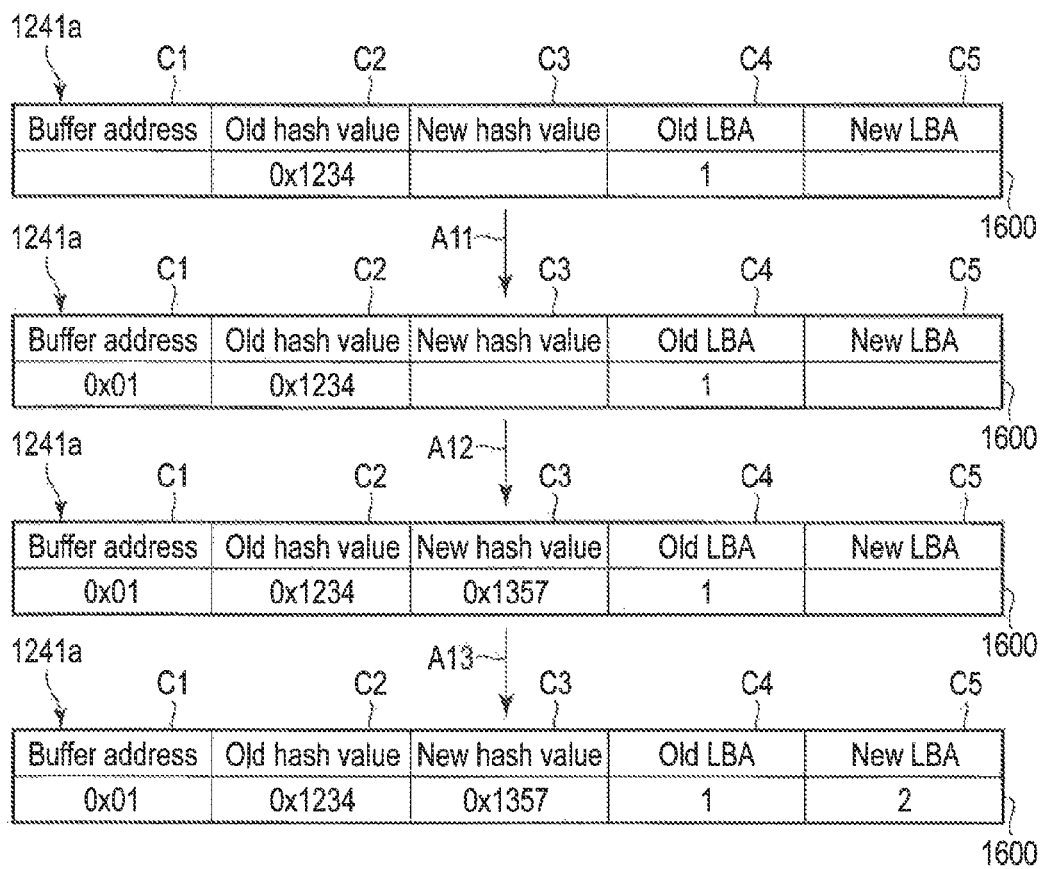
FIG. 17 is a view showing examples of changes in the content of the data management table in the second embodiment.

Referring next to FIGS. 16 and 17 in addition to the flowcharts of FIGS. 13 to 15, a description will be given of a specific example of daemon processing in the second embodiment. FIG. 16 shows an example of the data management table 1241a to which an entry has been added by the daemon processing, and FIG. 17 shows examples of changes in the content of the data management table 1241.

First, assume that the application 122 has issued a write request WR that instructs overwriting of offset OFSTi in already existing file F with data D2, as in the first embodiment. At this time, in accordance with the write request WR, the system call issue mechanism issues a write system call to the OS 121. Based on the write system call, the file system 1210 of the OS 121 starts a COW operation. First, the file system 1210 decomposes the write system call (write request WR) into a read request RR, first write request WR1, and second write request WR2, as in the first embodiment. After that, the file system 1210 issues the read request RR to the cache controller 125, unlike the first embodiment.

The cache controller 125 refers to the directory management table in accordance with the read request RR, and determines whether data D1 stored at LBAp indicated by the read request RR is also stored in the cache buffer 1250. Assume here that data D1 is stored in an area of the cache buffer 1250 designated by buffer address BA1. In this case, the cache controller 125 reads data D1 from the cache buffer 1250. After that, the cache controller 125 sends read data D1 to the file system 1210 as a response to the read request RR from the file system 1210.

At this time, the file system 1210 issues subsequent write request WR1 to the cache controller 125. Thus, in a cache hit state (first state) in which data D1 stored at LBAp indicated by the read request RR is also stored in the cache butter 1250, the read request RR is not issued from the file system 1210 to the device driver 123. The cache hit state indicates that read or write of data D1 is already performed before a COW operation based on the write request WR is started.

In the cache hit state, entry 1600 shown in FIG. 16 is already added to the data management table 1241a by the entry addition processing (step S24 of FIG. 13) or by the entry addition/update processing (step 625 of FIG. 13). Assume that hash value H1 and LBAp of data D1 are 0×1234 and 1, respectively, as in the first embodiment. In this case, hash value H1 (=0×1234) and LBAp (=1) of data D1 are set as an old hash value and an old LBA in fields C2 and C4 of entry 1600, respectively.

In contrast, in a mishit state (second state) where data D1 is not stored in the cache buffer 1250, the file system 1210 issues the read request RR also to the device driver 123. The device driver 123 sends the read request RR to the tiered storage device 20. The storage controller 23 of the tiered storage device 20 reads data D1 designated by the read request RR from the high-speed storage device 21 or the low-speed storage device 22, and sends data D1 to the device driver 123. The device driver 123 sends read data D1 to the file system 1210 as a response to the read request RR from the file system 1210. Moreover, as in the first embodiment, the device driver 123 calculates hash value H1 of data D1, and passes, to the daemon 124a, I/O information [I/O identifier=read, LBAp=1, H1=0×1234] corresponding to the read request RR. On the other hand, the cache controller 125 writes, to a free area in the cache buffer 1250, data D1 read by the storage controller 23 in accordance with the read request RR.

The I/O information processing unit 1242a of the damson 124a receives I/O information [I/O identifier=read, LBAp=1, H1=0×1234] from the device driver 123 (step S21). In this case, the I/O information processing unit 1242a performs entry addition processing (step S24) through steps S22 and S23. As a result, the I/O information processing unit 1242a adds, to the data management table 1241a, entry 1600 that has the received hash value H1 (=0×1234) and the received LBAp (=1) as an old hash value and an old LBA, as is shown in FIG. 16.

On the other hand, upon receiving, from the device driver 123 or the cache controller 125, a response to the read request RR, the file system 1210 issues write request WR1 to the cache controller 125. The cache controller 125 writes, to a free area in the cache buffer 1250, data D1 to be written (copied) to a logical block designated by LBAq, in accordance with write request WR1. Assume that the buffer address of this area is BA2 (=0×01).

Next, the cache controller 125 returns, to the file system 1210, a response to write request WR1. Further, the cache controller 125 passes, to the daemon 124a, I/O information [hash value H2 (=H1=0×1234) and buffer address BA2 (=0×01)] corresponding to write request WR1.

The I/O information processing unit 1242a of the daemon 124a receives I/O information [hash value H2 (=H1=0×1234) and buffer address BA2 (=0×01)] from the cache controller 125 (step S21). In this case, the I/O information processing unit 1242a performs entry update processing (step S26) through step S22, as described below.

First, the I/O information processing unit 1242a searches the data management table 1241a for en entry, as a target entry, which has a buffer address identical to the received buffer address BA2 (=0×01) (step S261). In this case, the I/O information processing unit 1242a cannot detect the target entry (No in step S262).

Therefore, the I/O information processing unit 1242a searches the data management table 1241a for an entry, as the target entry, which has, as an old hash value, a hash value equal to the received hash value H2 (=H1=0×1234) (step S264). In this case, the I/O information processing unit 1242a detects entry 1600 (see FIG. 16) as the target entry (Yes in step S265). The I/O information processing unit 1242a sets received buffer address BA2 (=0×01) in field C1 of entry 1600, as is indicated by arrow A11 in FIG. 17 (step S266).

Upon receiving, from the cache controller 125, a response to write request WR1, the file system 1210 issues subsequent write request WR2 to the cache controller 125. The cache controller 125, in turn, overwrites, with data D2 designated by write request WR2, an area of the cache buffer 1250 to which data D1 has been written in accordance with write request WR1, i.e., the area designated by buffer address BA2 (=0×01).

Next, the cache controller 125 returns, to the file system 1210, a response to write request WR2. Moreover, the cache controller 125 passes, to the daemon 124a, I/O information [hash value H3 (=0×1357) and buffer address BA2 (=0×01)] corresponding to write request WR2.

The I/O information processing unit 1242a of the daemon 124a receives I/O information [hash value H3 (=0×1357) and buffer address BA2 (=0×01)] from the cache controller 125 (step S21). In this case, the I/O information processing unit 1242a performs entry update processing (step S26) through step S22, as described below.

First, the I/O information processing unit 1242a searches the data management table 1241a for an entry, as a target entry, which has a buffer address identical to received buffer address BA2 (=0×01) (step S261). In this case, the I/O information processing unit 1242a can detect entry 1600 (see FIG. 17) as the target entry (Yes in step S262). Therefore, the I/O information processing unit 1242a sets received hash value H3 (=0×1357) in field C3 of entry 1600 as a new hash value, as is indicated by arrow A12 in FIG. 17 (step S263).

When write request WR2 is issued to the cache controller 125, the file system 1210 causes the device driver 123 to send write request WR2 to the tiered storage device 20, unlike the issuance of write request WR1. At this time, the storage controller 23 of the tiered storage device 20 writes data 22 to the high-speed storage device 21 or the low-speed storage device 22, based on physical address PAq allocated to logical block address LBAq (=2) designated by write request WR2. After that, the storage controller 23 returns, to the device driver 123, a response to write request WR2. The file system 1210 receives this response from the device driver 123, thereby completing the COW operation based on the write request WR. The subsequent operations of the file systems 1210 are the same as those in the first embodiment.

When the device driver 123 sends write request WR2 to the tiered storage device 20, it generates I/O information [I/O identifier=write, LBAq (=2), H3 (=0×1357)] corresponding to write request WR2 as in the first embodiment. Upon receiving the I/O information [I/O identifier=write, LBAq (=2), H3 (=0×1357)](step S21), the I/O information processing unit 1242a performs entry addition/update processing (step S25) through steps S22 and S23, as follows:

First, the I/O information processing unit 1242a searches the data management table 1241a for an entry, as a target entry, which has, as an old LBA, an LBA identical to received LBAq (=2) (step S251). In this example, the I/O information processing unit 1242a cannot detect the target entry (No in step S252).

Therefore, the I/O information processing unit 1242a searches the data management table 1241a for an entry, as the target entry, which has, as a new hash value, a hash value equal to the received hash value H3 (=0×1357) (step S253). In this example, the I/O information processing unit 1242a can detect entry 1600 (FIG. 17) as the target entry (Yes in step S254).

At this time, the I/O information processing unit 1242a sets received LBAq (=2) as a new LBA in field C5 of entry 1600, as is indicated by arrow A13 in FIG. 17 (step S257). Next, the I/O information processing unit 1242a performs COW notification for notifying the tiered storage device 20 of the content (namely, old and new LBAs) of fields C4 and C5 of entry 1600 (step S258). After that, the I/O information processing unit 1242a deletes entry 1600 from the data management table 1241 (step S259).

In accordance with a COW notification from the I/O information processing unit 1242a, the storage controller 23 of the tiered storage device 20 carries over a count associated with the old LBA (=LBAp=1) in the access count table 230 to a count associated with the new LBA (=LBAq=2) in the access count table 230. After that, the storage controller 23 clears the count associated with the old LBA (=LBAp=1).

In the second embodiment, the daemon 124a (i.e., the inner I/O information processing unit 1242a in the daemon 124a) can detect the COW operation of the file system 1210 in real time, and notify the tiered storage device 20 of the old and new LBAs associated with the COW operation, by processing I/O information passed from the device driver 123 and the cache controller 125. As a result, the storage controller 23 of the tiered storage device 20 can realize tiering that correctly reflects the status of an access request issued from the application 122 (in particular, the status of a write request for overwriting file F with new data), even if the COW function of the file system. 1210 is effective and computer 10\_1 (to computer 10\_n) includes a cache. Moreover, for realizing tiering, it is not necessary to change the OS 121 (file system 1210) and the application 122.

Third Embodiment

Next, a description will be given of a tiered storage system according to a third embodiment. Assume that the tiered storage system of the third embodiment has the same hardware configuration as the tiered storage systems of the first and second embodiments. Therefore, FIG. 1 will be referred to for convenience to describe the configuration of the tiered storage system according to the third embodiment. However, the tiered storage system of the third embodiment differs in the functional configuration of computer 10\_1 (to computer 10\_n) from the systems of the first and second embodiments. For instance, computer 10\_1 in the third embodiment includes a device driver 123b and a daemon 124b (see FIG. 18) having functions different from those of the device driver 123 and the daemon 124 (124a). Moreover, on computer 10\_1 in the third embodiment, an application 122b (see FIG. 18) having a function different from that of the application 122 runs. Therefore, in the third embodiment, if necessary, the application 122, the device driver 123 and the daemon 124 shown in FIG. 1 may be replaced with the application 122b, the device driver 123b and the daemon 124b, respectively.

Referring now to FIG. 18, the functional configuration of the tiered storage system of the third embodiment will be described with reference to FIG. 18, with points different from those of the first embodiment mainly focused on. FIG. 18 is a block diagram showing an exemplary functional configuration of the tiered storage system of the third embodiment.

The application 122b runs on computer 10\_1 shown in FIG. 18. The application 122b generates I/O information corresponding to a read or write request, and passes the I/O information to the daemon 124b. The I/O information from the application 122b includes file information [filename, offset] and a hash value. This hash value is calculated based on data read from or written to a position in the file, designated by the file information [filename, offset].

Further, in computer 10\_1 shown in FIG. 18, the device driver 123b generates I/O information corresponding to a read or write request from the file system 1210, and passes the I/O information to the daemon 124b. The I/O information from the device driver 123b includes an LBA designated by the read or write request, and the hash value of data read or written by the read or write request. Based on the I/O information from the application 122b and the device driver 123, the daemon 124b detects a plurality of LBAs that correspond to one file information item [filename, offset] and result from a COW operation.

Figure 19:
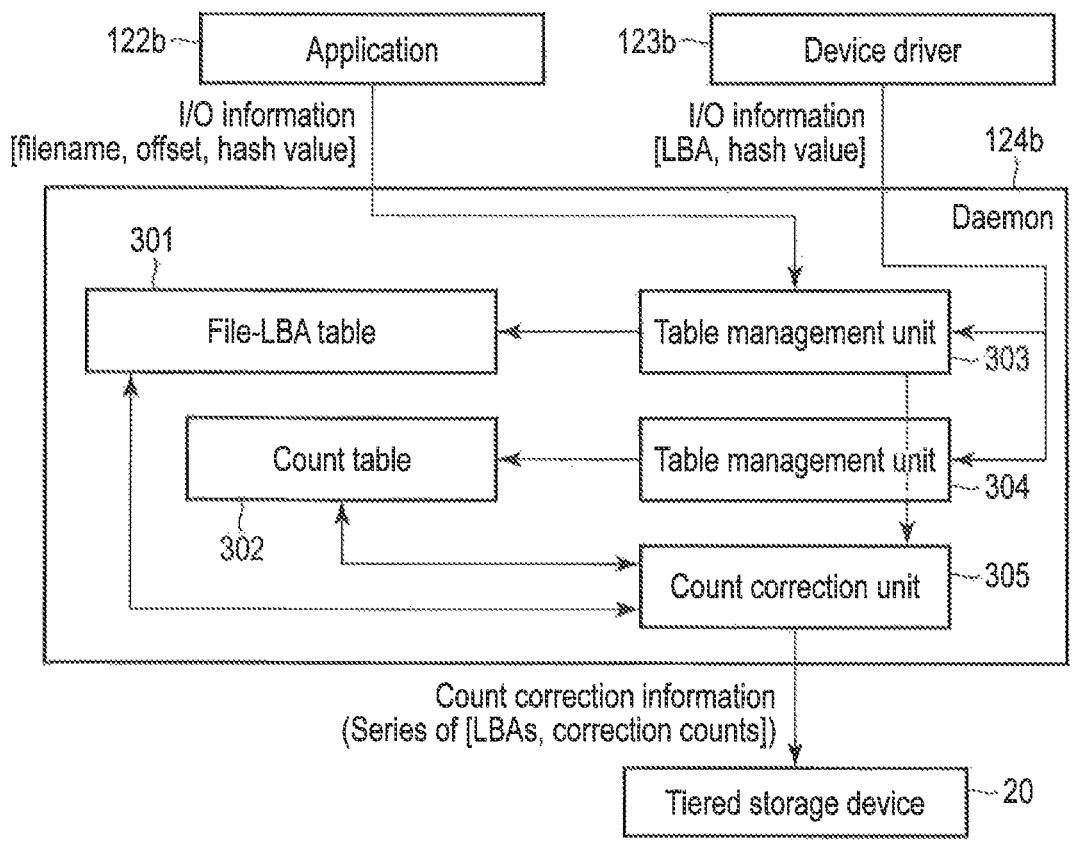
FIG. 19 is a block diagram showing an exemplary functional configuration of a daemon shown in FIG. 18.

FIG. 19 is a block diagram showing an exemplary functional configuration of the daemon 124b shown in FIG. 18. The daemon 124b includes a file-LBA table 301, a count table 302, table management units 303 and 304 and a count correction unit 305.

Each of the entries of the file-LBA table 301 is used to hold file information [filename, offset] and a LBA list in association with each other, as will be described later. Each of the entries of the count table 302 is used to hold an LBA, a count and last-access-time/date information, as will be described later.

The table management unit 303 performs first table management processing, thereby managing (updating) the file-LBA table 301 based on the I/O information from the application 122b and the device driver 123b. The table management unit 304 performs second table management processing, thereby managing (updating) the count table 302 based on I/O information from the device driver 123b.

The I/O information from the application 122b includes a filename, an offset and a hash value. The hash value in the I/O information is calculated based on data read from or written to a position in the file designated by the filename and the offset in the I/O information. The I/O information from the device driver 123b includes the LBA and hash value of an access destination. That is, the I/O information from the device driver 123b is the same as that from the device driver 123 except that the former includes no I/O identifier.

The count correction unit 305 generates count correction information used to correct a count in the access count table 230 of the tiered storage device 20, based on the file-LBA table 301 and the count table 302, and performs count correction processing for sending the count correction information to the tiered storage device 20. In the count correction processing, the count correction unit 305 detects, based on the file-LBA table 301 and the count table 302, a state where accesses to the same offset in the same file have been counted by a COW operation as accesses to a plurality of LBAs. In the count correction processing, the count correction unit 305 calculates a correction value (correction count) used to cause a count (count in the access count table 230) associated with an LBA lastly accessed in the LBA list by the count correction processing, to coincide with the number of accesses to the same offset in the same file. In the count correction processing, the count correction unit 305 sends, to the tiered storage device 20, count correction information including a series of combinations of LBAs and correction counts, based on the calculation result.

Figure 20:
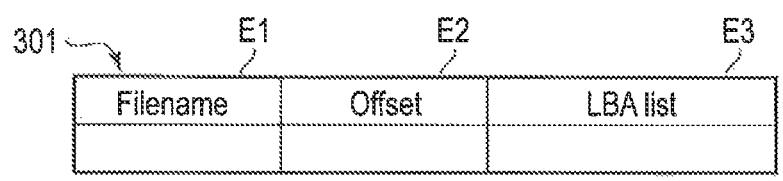
FIG. 20 is a view showing a data structure example of a file-LBA table shown in FIG. 19.

FIG. 20 shows a data structure example of the file-LBA table 301 shown in FIG. 19. Each of the entries of the file-LBA table 301 includes fields E1 to E3. Field E1 is a filename field used to hold a filename, and field E2 is an offset field used to hold an offset in a file indicated by the filename. That is, fields E1 and E2 are used to hold file information [filename, offset]. Field E3 is an LBA list field used to hold one or more LBAs at which data at offsets in the file indicated by the content of fields E1 and E2 of a corresponding entry is stored. That is, field E3 is prepared, supposing that a plurality of LBAs corresponding to one file information item [filename, offset] may result from a COW operation. The file-LBA table 301 having such a structure as the above is a kind of mapping table.

Figure 21:
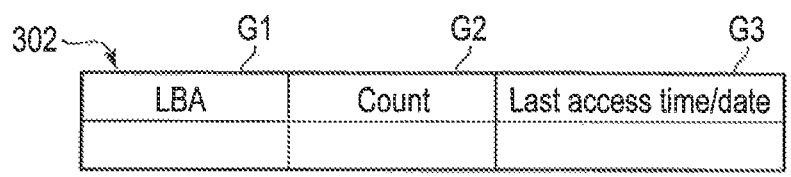
FIG. 21 is a view showing a data structure example of a count table shown in FIG. 19.

FIG. 21 shows a data structure example of the count table 302 shown in FIG. 19. Each of the entries of the count table 302 includes fields G1 to G3. Field G1 is an LBA field used to hold an LBA. Field G2 is a count field used to hold the count of accesses to an area (block) indicated by an LBA currently held in field G1 of a corresponding entry. Field G3 is a last-access-time/date field used to hold a last-access-time/date information that indicates a time and date at which the corresponding entry was lastly accessed.

Figure 22:
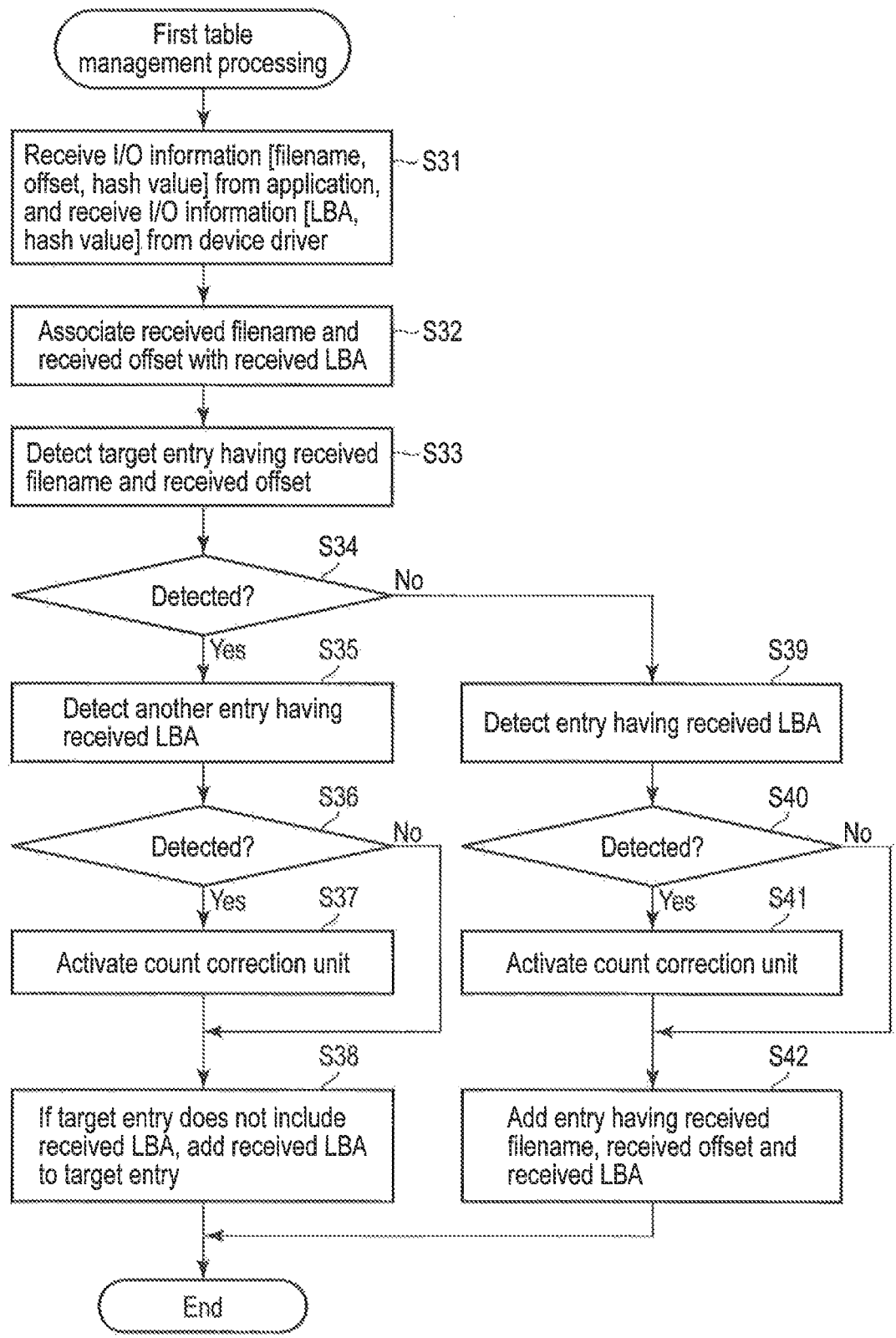
FIG. 22 is a flowchart showing an exemplary procedure of first table management processing in the third embodiment.

Referring next to FIG. 22, a description will be given of first table management processing performed by the table management unit 303 in the third embodiment. FIG. 22 is a flowchart showing an exemplary procedure of the first table management processing.

First, assume that the application 122b has issued a read or write request. The read or write request from the application 122b includes file information [filename, offset] that indicates an access destination. In accordance wish the read or write request, a read or write system call is issued from the system call issue mechanism so the OS 121.

The file system 1210 of the OS 121 causes the device driver 123b to send a read or write request to the tiered storage device 20 in accordance with the read or write system call. The read or write request from the device driver 123b includes an LBA indicating an access destination. Based on a physical address allocated to the LBA designated by the read or write request, the storage controller 23 of the tiered storage device 20 executes a data read from or a data write to the high-speed storage device 21 or the low-speed storage device 22.

In accordance with the data read or write, the application 122b passes I/O information [filename, offset, hash value] to the daemon 124b. Similarly, the device driver 123b passes I/O information [LBA, hash value] to the daemon 124b.

The table management unit 303 of the daemon 124b receives I/O information [filename, offset, hash value] from the application 122b, and I/O information [LBA, hash value] from the device driver 123b (step S31). If both the received hash values of the I/O information items are equal to each other, the table management unit 303 associates the received filename and the received offset with the received LBA (step S32). In contrast, if both the received hash values are not equal, the table management unit 303 completes the first table management processing. However, this step is omitted in the flowchart of FIG. 22.

Next, the table management unit 303 searches the file-LBA table 301 for an entry, as a target entry, which has a filename and an offset coinciding with the received filename and the received offset, respectively (step S33). After that, the table management unit 303 determines whether the target entry has been detected (step S34). If the answer to step S34 is Yes, the table management unit 303 searches the entries of the file-LBA table 301, other than the target entry for another entry which has the same LBA as the received LBA (step S35). The table management unit 303 determines whether the entry having the same LBA as the received LBA has been detected (step S36).

If the LBA list in field E3 of the target entry does not include an LBA identical to the received LBA, the table management unit 303 adds the received LBA to the LBA list, regardless of the determination result of step S36 (step S38). Accordingly, if the answer to step S35 is Yes, this means that an area (logical block) designated by the same LBA has been accessed based on different combinations of filenames and offsets. This shows that a logical block used in a COW operation has been collected and reused. Therefore, if the answer to step S36 is Yes, the table management unit 303 executes step S37 before step S38. In step S37, the table management unit 303 activates the count correction unit 305 to make it perform count correction processing.

In contrast, if the answer to step S34 is No, the table management unit 303 searches the file-LBA table 301 for an entry having the same LBA as the received LBA (step S39). After that, the table management unit 303 determines whether the entry having the same LBA as the received LBA has been detected (step S40).

The table management unit 303 adds, to the file-LBA table 301, an entry having the received filename, the received offset and the received LBA, regardless of the determination result of step S40 (step S42). Accordingly, if the answer to step S40 is Yes, it means that a logical block designated by the same LBA has been accessed based on combinations of filenames and offsets. This shows that a logical block used in a COW operation has been collected and reused. Therefore, if the answer to step S40 is Yes, the table management unit 303 executes step S41 before step S42. In step S41, the table management unit 303 activates the count correction unit 305 to make it perform count correction processing. After executing step S36 or S42, the table management unit 303 completes the first table management processing.

Referring then to FIG. 23, a description will be given of second table management processing performed by the table management unit 304 in the third embodiment. FIG. 23 is a flowchart showing an exemplary procedure of the second table management processing.

First, assume that the file system 1210 has caused the device driver 123b to send a read or write request to the tiered storage device 20. Therefore, assume that the storage controller 2 of the tiered storage device 20 has executed a data read or write form or to the high-speed storage device 21 or the low-speed storage device 22.

In accordance with the data read or write, the device driver 123b passes I/O information [LBA, hash value] to the daemon 124b. The table management unit 304 of the daemon 124 receives the I/O information [LBA, hash value] from the device driver 123b (step S51).

Next, the table management unit 304 searches the count table 302 for an entry, as a target entry, which has the same LBA as the received LBA (step S52). After that, the table management unit 304 determines whether the entry having the same LBA as the received LBA has been detected (step S53). If the an ewer to step S53 is Yes, the table management unit 304 increments a count in the detected entry by one, and updates last-access-time/date information in the detected entry so that this information indicates a current time/date (step S54).

In contrast, if the answer to step S53 is No, the table management unit 303 adds, to the count table 302, an entry including the received LBA, a count of 1, and the last-access-time/date information indicating the current time/date (step S55). After executing step S54 or S55, the table management unit 303 completes the second table management processing.

Figure 24:
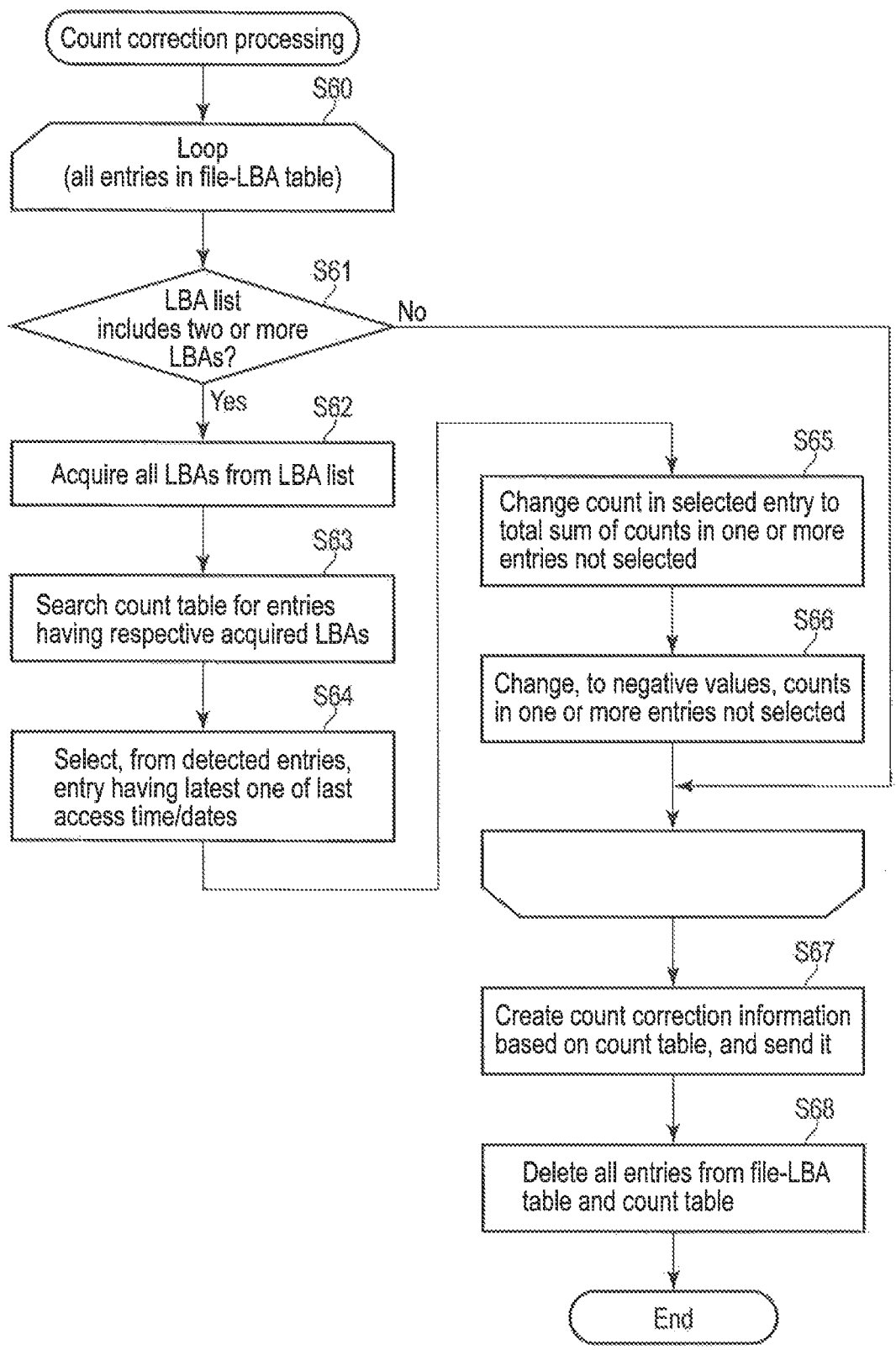
FIG. 24 is a flowchart showing an exemplary procedure of count correction processing in the third embodiment.

Referring to FIG. 24, a description will be liven of count correction processing performed by the count correction unit 305 in the third embodiment when the count correction unit 305 is activated by the table management unit 303 (step 37 or S41 in FIG. 22). FIG. 24 is a flowchart showing an exemplary procedure of the count compensation processing. In the third embodiment, the count correction unit 305 is activated by a request from the storage controller 23 also when the storage controller 23 of the tiered storage device 20 performs tiering processing.

The count correction unit 305 iterates processing including step S61, described below, for all entries of the file-LBA table 301 (step S60). Assume here that the processing including step S61 is performed for the i-th entry of the count table 302.

First, the count correction unit 305 determines whether an LBA list in the i-th entry includes two or more LBAs (step S61). If the answer to step S61 is Yes, the count correction unit 305 determines that a COW operation has been performed based on a request of access (an access request from the application 122b) to a block designated by the combination of a filename and an offset in the i-th entry. That is, the count correction unit 305 determines that the i-th entry includes all LBAs (two or more LBAs) accessed based on the COW operation. Therefore, the count correction unit 305 acquires all LBAs included in the i-th entry (step S62).

Next, the count correction unit 305 searches the count table 302 for entries having the respective acquired LBAs (step S63). After that, the count correction unit 305 compares last access time/dates indicated by the last-access-time/date information of all detected entries, thereby selecting an entry having a latest one of the last access time/dates (step S64).

Next, the count correction unit 305 calculates the sum total of the counts in the remaining (one or more) entries that were not selected, and changes a count in the selected entry into the calculated sum total (step S65). Moreover, the count correction unit 305 changes, into a negative value, a count in each of the remaining entries that were not selected (step S66). At this time, the count correction unfit 305 completes the processing associated with the i-th entry.

In contrast, if the answer to step S61 is No, the count correction unit 305 determines that the block designated by the combination of the filename and the offset in the i-th entry is irrelevant to the COW operation. Therefore, the count correction unit 305 determines that it is not necessary to correct a count associated with a single LBA in the i-th entry of the access count table 230. At this time, the count correction unit 305 completes the processing associated with the i-th entry. The count correction unit 305 iterates the above-mentioned processing (including step S61) for all entries of the file-LBA table 301 (step S60).

After that, the count correction unit 305 creates count correction information based on the count table 302, and sends the count correction information to the tiered storage device 20 (step S67). The count correction information includes a series of combinations of LBAs and correction counts. Each of the correction counts is a count corrected in step S65 or S66. Next, the count correction unit 305 deletes all entries from the file-LBA table 301 and the count table 302 (step S68), thereby completing the count correction processing (step S69).

Referring now to FIGS. 25 to 31 in addition to the flowcharts of FIGS. 22 to 24, a description will be given of specific examples of the first and second table management processing and the count correction processing in the third embodiment. FIG. 25 shows an example of the file-LBA table, to which an entry has been added by the first table management processing, and FIG. 26 shows an example of the count table, to which an entry has been added by the second table management processing. FIG. 27 shows examples of changes, in the content of the count table in the third embodiment, and FIG. 28 shows an example of the file LBA table, in which the content of the LBA list in an entry has been updated by the first table management processing. FIG. 29 shows a count correction information example created by the count correction processing, FIG. 30 shows a content example of the access count table in the third embodiment, and FIG. 31 shows a corrected content example of the access count table in the third embodiment.

First, for simplifying the description, the file LBA table 301 and the count table 302 are assumed to be initialized. In this state, the application 122b is assumed to have created the data of a block corresponding to an offset of 0 in new file F. Assume also that the filename of file F is F1, the data of the block corresponding to the offset of 0 in file F is D1, and the hash value of data D1 is 0×1234. Further, assume that data D1 is to be written to a logical block having an LBA of 1 (LBA=LBAp=1).

In this case, the application 122b passes I/O information [filename=F1, offset=0, hash value=0×1234] to the daemon 124b. On the other hand, the device driver 123b passes I/O information [LBA=1, hash value=0×1234] to the daemon 124b.

At this time, the table management unit 303 of the daemon 124b associates filename=F1 and offset=0 in the I/O information [filename=F1, offset=0, hash value=0×1234]

with LBA=1 in the I/O information [LBA=1, hash value=0×1234], based on hash value=0×1234 (steps S31 and S32 in FIG. 22). Further, the table management unit 303 adds, to the file-LBA table 301, entry 2501 having filename=F1, offset=0 and LBA=1 (steps S33, S34, S39, S40 and S42 in FIG. 22), as is shown in FIG. 25. On the other hand, the table management unit 304 adds, to the count table 302, the entry 2601 having LBA=1, count=1, and last-access-time/date information indicating a current time/date (2015/xx/yy 15:00) (steps S51 to S53 and S55 in FIG. 23), as is shown in FIG. 26.

Thereafter, assume that the application 122b has executed reading of data D1 from the block corresponding to the offset of 0 in file F. In this case, the application 122b passes the I/O information [filename=F1, offset=0, hash value=0×1234] to the daemon 124b. On the other hand, the device driver 123b passes the I/O information [LBA=1, hash value=0×1234] to the daemon 124b.

At this time, the table management unit 303 of the daemon 124b associates filename=F1 and offset=0 in the I/O information [filename=F1, offset=0, hash value=0×1234] with LBA=1 in the I/O information [LBA=1, hash value=0×1234], based on hash value=0×1234 (steps S31 and S32 in FIG. 22). Therefore, the file-LBA table 301 includes entry 2501 having filename=F1 and offset=0 (Yes in step S34 of FIG. 22). LBA=1 exists in entry 2501. Accordingly, the table management unit 303 does not perform step S8 of FIG. 22. This means that the content of field E3 of entry 2501 is not updated.

In contrast, the count table 302 includes entry 2601 having LBA=1 (Yes in step S53 of FIG. 23), as is shown in FIG. 26. At this time, the table management unit 303 increments, by one, a count in entry 2601 that assumes a state shown in FIG. 26, thereby updating the count to 2 and updating the last-access-time/date information to indicate a current time (2015/xx/yy 16:00) (step S54 of FIG. 23), as is indicated by arrow A21 in FIG. 27.

Thereafter, the application 122b is assumed to have issued a write request WR to request overwriting of an area corresponding to the offset of 0 in file F with data D2. In this case, by a COW operation according to the write request WR, the file system 1210 decomposes the write request WR into a read request RR and write requests WR1 and WR2. Further, assume that by executing the read request RR and write requests WR1 and WR2, data D2 is written to a logical block having an LBA (=LBAp=2) different from an LBA (=LBAp=1) of a logical block to which data D1 has been written. The hash value of data D2 is 0×1357, as mentioned above.

In this case, the application 122b passes, to the daemon 124b, I/O information [filename=F1, offset=0, and hash value=0×1357] corresponding to the write request WR. On the other hand, the device driver 123b sequentially passes, to the daemon 124b, I/O information [LBA=1, hash value=0×1234] corresponding to the read request RR, I/O information [LBA=2, hash value=0×1234] corresponding to write request WR1, and I/O information [LBA=2, hash value=0×1357] corresponding to write request WR2.

Both the I/O information corresponding to the write request WR and the I/O information corresponding to write request WR2 include hash value=0×1357. Therefore, the table management unit 303 of the daemon 124b associates filename F1 and offset=0 in the I/O information corresponding to the write request WR, with LBA=2 in the I/O information corresponding to write request WR2, based on hash value=0×1357 (steps S31 and S32 of FIG. 22).

In contrast, the I/O information items corresponding to the read request RR and write request WR1 include a hash value (=0×1234) different from hash value=0×1357. Therefore, the table management unit 303 does not associate the LBAs in the I/O information items corresponding to the read request RR and write request WR1 with filename=F1 and offset=0 in the I/O information corresponding to the write request WR. This is equivalent to the recognition of the table management unit 303 (daemon 124b) that only write request WR2 included in the read request RR and write requests WR1 and WR2 is an access request corresponding to the write request WR.

At this time, the file-LBA table 301 includes entry 2501 having filename=F1 and offset=0, as shown in FIG. 25. In this case, the table management unit 303 can detect entry 2501 as a target entry (Yes in step 234 of FIG. 22), LBA=2 does not exist in entry 2501 shown in FIG. 25. Therefore, the table management unit 303 adds LBA=2 to the LBA list of field E3 of entry 2501 shown in FIG. 25 (step S38 of FIG. 22). As a result, the content of the LBA list of entry 2501 is changed as shown in FIG. 28.

The count table 302 having entry 2601 updated as indicated by arrow A21 in FIG. 27 does not include an entry having LBA=2 (No in step S53 of FIG. 23). In this case, the table management unit 304 adds, to the count table 302, entry 2602 including LBA=2, count=1, and last-access-time/date information indicating a current time/date (2015/xx/yy 17:00) (step S55 of FIG. 23), as is indicated by arrow A22 in FIG. 27.

Thereafter, assume that the storage controller 23 has requested count correction information from computer 10_1 for executing tiering processing. The count correction unit 305 of the daemon 124b of computer 10_1 performs count correction processing in accordance with the flowchart shown in FIG. 24, thereby creating count correction information (step S67 of FIG. 24).

Assume here that the file-LBA table 301 includes entry 2501 in estate as shown in FIG. 28, and the count table 302 includes entries 2601 and 2602 in states indicated by arrow A22 in FIG. 27. In this state, the LBA list of entry 2501 includes two LBAs, i.e., LBA=1, and LBA=2. Similarly, entries 2601 and 2602 include LBA=1 and LBA=2, respectively.

Therefore, the count correction unit 305 acquires LBA=1 and LBA=2 from the LBA list of entry 2501 (steps S61 and S62 of FIG. 24). Further, the count correction unit 305 searches the count table 302 for entries 2601 and 2602 having LBA=1 and LBA=2, respectively (step S63 of FIG. 24). The count correction unit 305 selects, from entries 2601 and 2602, entry 2602 whose last access time/date is latest (step S64 of FIG. 24). The count in entry 2601, which has not been selected, is 2. In this case, the count of 2 is used as the sum total of the counts in one or more entries which have not been selected.

Thereafter, the count correction unit 305 changes the count (=1) in selected entry 2602 into 2 (more specifically, +2) (step S65 of FIG. 24). Moreover, the count correction unit 305 changes, into a negative value, i.e., −2, the count (=2) in entry 2601 that has not been selected (step S66 of FIG. 24).

Next, the count correction unit 305 creates count correction information shown in FIG. 29, based on the content (namely, the combinations of LBAs and counts in updated entries 2601 and 2602) of the updated count table 302 (step S67 of FIG. 24). This count correction information includes a list [(LBA=1, correction count=−2) (LBA=2, correction count=+2)] that includes a series of combinations of LBAs and counts in the updated count table 302, as a series of combinations of LBAs and corrected counts. In step S67, the count correction unit 305 sends the created count correction information to the tiered storage device 20. After that, the count correction unit 305 deletes all entries from the file-LBA table 301 and the count table 302 (step S68 of FIG. 24). That is, the count correction unit 305 deletes entry 2501 from the file-LBA table 301, and deletes entries 2601 and 2602 from the count table 302.

On the other hand, the storage controller 23 of the tiered storage device 20 adds an entry including a designated LBA (received LBA) and count=1 to the access count table 230 in accordance with a read or write request from the device driver 123b. Further, if the entry including the designated LBA exists in the access count table 230, the storage controller 23 increments the count in this entry by one.

In the third embodiment, it is assumed that when the application 122b has created data D1 of the block corresponding to the offset of 0 in new file F, the device driver 123b has sent, to the tiered storage device 20, a write request to write data D1 to LBA=1. Thereafter, it is assumed that when the application 122b has requested a data read from the block corresponding to the offset of 0 in file F, the device driver 123b has sent, to the tiered storage device 20, a read request to read data from LBA=1. After that, when the application 122b has requested to overwrite the block corresponding to the offset of 0 in file F with data D, the device driver 123b sequentially sends, to the tiered storage device 20, a read request RR and write requests WR1 and WR2 in accordance with a COW operation by the file system 1210, as in the first embodiment.

In this case, the access count table 230 includes entries 3001 and 3002 having LBA=1 and LBA=2, respectively, as is shown in FIG. 30. Further, counts in entries 3001 and 3002 associated with LBA=1 and LBA=2 are 3 and 2, respectively, as is shown in FIG. 30.

When the count correction unit 305 has sent, to the tiered storage device 20, count correction information [(LBA=1, correction count=−2) (LBA=2, correction count=+2)] shown in FIG. 29, the storage controller 23 corrects the access count table 230 based on the count correction information, as follows: First, the storage controller 23 selects entry 3001 that is included in the access count table 230, and has an LBA identical to an LBA (=1) in the leading element (LBA=1, correction count=−2) of the count correction information. After that, the storage controller 23 adds correction count=−2 to count=3 in entry 3001. As a result, the count in entry 3001 is corrected to 1 as shown in FIG. 31.

Next, the storage controller 23 selects entry 3002 that is included in the access count table 230, and has an LBA identical to an LBA (=2) in a subsequent (last) element (LBA=2, correction count=+2) in the count correction information). Subsequently, the storage controller 23 adds correction count=+2 to count=2 in entry 3002. As a result, the count in entry 3002 is corrected to 4 as shown in FIG. 31.

The total sum (first total sum) of the counts in entries 3001 and 3002 of the access count table 230 is 5 before and after the correction (see FIGS. 30 and 31). In contrast, the total sum (second total sum) of the counts in entries 2601 and 2602 of the access count table 230 is 3 (see FIG. 27), and is not equal to the first total sum. The reason is that the daemon 124b recognizes that only write request WR2 included in the read request RR and write requests WR1 and WR2 corresponds to the write request WR from the application 122b.

However, in the third embodiment, even if there is a difference in counts between the access count table 230 and the count table 302, the access count table 230 can be corrected to be made, as far as possible, to approach a file access status recognized by the application 122b. This enables the storage controller 23 of the tiered storage device 20 to realize tiering that relatively correctly reflects the status of access requests issued by the application 122b even when the COW function of the file system 1210 is effective.

Modification of Third Embodiment>

Next, a description will be given of a tiered storage system according to a modification of the third embodiment. The first feature of this modification lies in that computer 10_1 includes a daemon 124c (see FIG. 32) having a function of treating data associated with a snapshot. Therefore, in this modification, the daemon 124 shown in FIG. 1 may be replaced with the daemon 124c, if necessary. Further, as in the third embodiment, the application 122 and the device driver 123 shown in FIG. 1 may be replaced with the application 122b and the device driver 123b, respectively.

The functional configuration of the tiered storage system according to the modification of the third embodiment will be described with reference to FIG. 32, with points different from those of the third embodiment mainly focused on. FIG. 32 is a block diagram showing an exemplary functional configuration of the tiered storage system according to the modification of the third embodiment, in FIG. 32, computer 10_1 includes a snapshot unit 126, unlike the third embodiment. Further, in FIG. 32, computer 10_1 includes the daemon 124c used in place of the daemon 124b in the third embodiment.

The snapshot unit 126 creates and deletes a backup (namely, a snapshot) of a file. To this end, the snapshot unit 126 issues a snapshot create or deletion request to the OS 121. The create or deletion request includes I/O information associated with a snapshot to be created or deleted. This I/O information includes the filename of a file to be backed up as a snapshot, or of a file corresponding to a snapshot to be deleted, and the snapshot name of the snapshot.

In the modification, the snapshot of a file is created in an area (a first area) where this file is stored. That is, the snapshot of a file is created without moving the data of the file. Accordingly, immediately after a snapshot is created, a file in the first area (namely, an original file) is referred to as the snapshot. This means that no particular area is needed for the snapshot. When the application 122b changes the data of an original file in a state where a COW function is effective, the file system 1210 writes, by the COW operation, new data for the file to an area different from the area of the original file. The data before change is in a state where it is referred to as a snapshot.

When the snapshot unit 126 issues a snapshot create or deletion request to the OS 121, it passes, to the daemon 124c, the above-mentioned I/O information corresponding to the create or deletion request in addition to the function described in the third embodiment, the daemon 124c also has a function of managing snapshots.

Figures 33, 34:
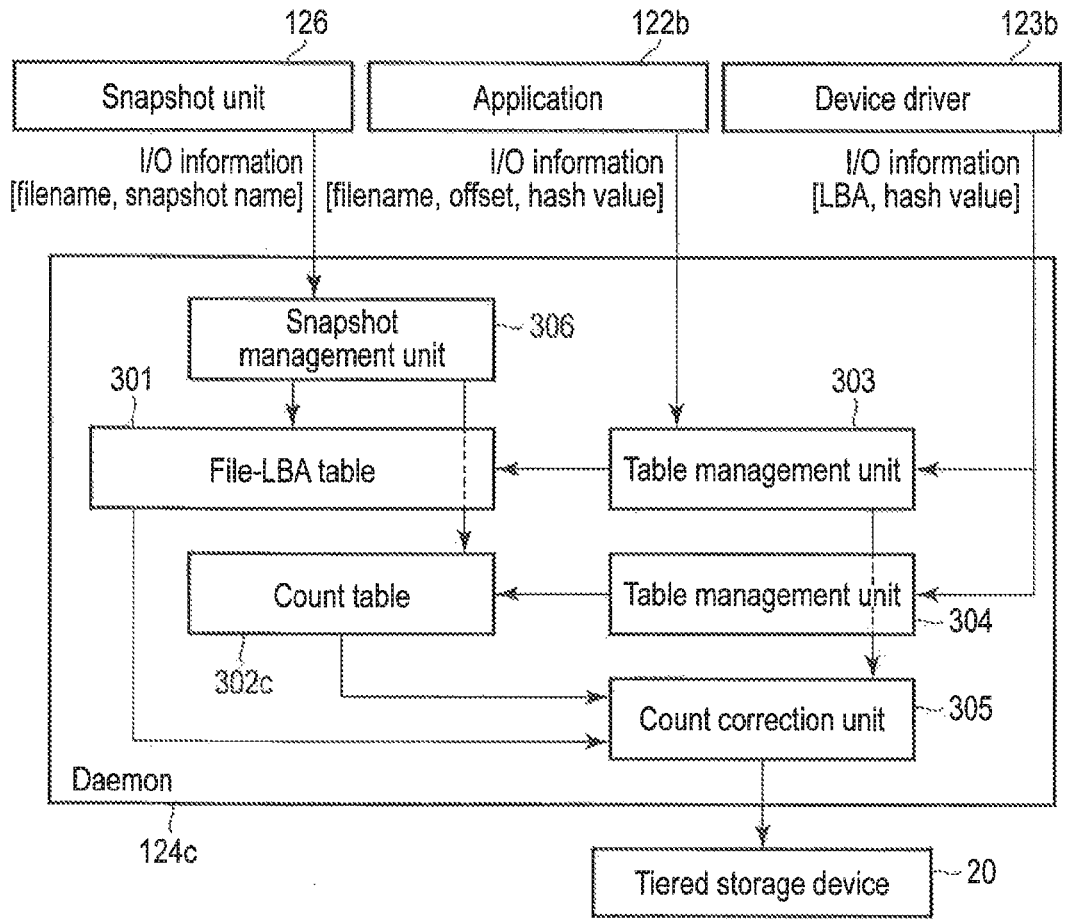
FIG. 33 is a block diagram showing an exemplary functional configuration of a daemon shown in FIG. 32.
FIG. 34 shows a data structure example of a count table shown in FIG. 33.

FIG. 33 is a block diagram showing an exemplary functional configuration of the daemon 124c shown in FIG. 32. The daemon 124c includes the file-LBA table 301, the table management units 303 and 304 and the count correction unit 305, like the daemon 124b of the third embodiment. The daemon 124c further includes a count table 302c used in place of the count table 302 of the third embodiment, and a snapshot management unit 306 corresponding to the snapshot unit 126 shown in FIG. 32.

FIG. 34 shows a data structure example of the count table 302c shown in FIG. 33. Each of the entries of the count table 302c includes fields G1 to G3, like the count table 302 of the third embodiment. Each of the entries of the count table 302c further includes field G4, unlike the count table 302. Field G4 indicates the number (this number will hereinafter be referred to as a reference count) of different snapshots when data stored in a logical block indicated by the content (LBA) of field G1 in a corresponding entry is concurrently referred to as the different snapshots.

The snapshot management unit 306 shown in FIG. 33 executes first snapshot management processing, based on I/O information [filename, snapshot name] corresponding to a snapshot create request from the snapshot unit 126. Moreover, the snapshot management unit 306 executes second snapshot management processing, based on I/O information [filename, snapshot name] corresponding to a snapshot deletion request from the snapshot unit 126.

Referring then to FIG. 35, a described will be given of the first snapshot management processing performed by the snapshot management unit 306 in the modification of the third embodiment. FIG. 35 is a flowchart showing an exemplary procedure of the first snapshot management processing.

First, assume that the snapshot unit 126 has issued a snapshot create request, to the file system 1210. Assume also that the snapshot create request includes the combination of filename F1 of file F and snapshot name SS1. Thus, the file system 1210 manages file F indicated by filename F1 as a snapshot indicated by snapshot name SS. The snapshot unit 126 passes, to the daemon 124c, the same I/O information [filename=F1, snapshot name=SS1] as the combination of filename F1 and snapshot name SS1 included in the snapshot create request.

At this time, the snapshot management unit 306 of the daemon 124c executes the first snapshot management processing indicated by the flowchart of FIG. 35, as follows: First, the snapshot management unit 306 receives I/O information [filename=F1, snapshot name=SS1] from the snapshot unit 126 (step S71).

Next, the snapshot management unit 306 selects, from the file-LBA table 301, all entries having the same filename as received filename F1 (step S72). After that, the snapshot management unit 306 extracts LBA lists from all selected entries (step S73).

Next, based on all LBAs in all extracted LBA lists, the snapshot management unit 306 refers to all entries that are included in the file-LBA table 301 and are associated with the respective, LBAs (step S74). In step S74, the snapshot management unit 306 selects, from all referred entries, an entry including a latest one of the last access time/dates, and extracts an LBA from the selected entry. That is, the snapshot management unit 306 extracts, from all referred entries, an LBA having the latest one of the last access time/dates. The extracted LBA indicates a logical area (block) where newest data of a file (more specifically, newest data at a certain offset in the file) which is to be created as a snapshot is stored.

Next, the snapshot management unit 306 selects all entries included in the count table 302c and associated with all LBAs in an LBA list including the extracted LBA, and increments, by one, respective reference counts in all selected entries (step S75). Next, the snapshot management unit 306 adds, to the file-LBA table 301, an entry that has the received snapshot name SS1 as its filename and includes, as an LBA list, the extracted LBA (namely, the latest LBA) (step S76). The snapshot management unit 306 uses, as en offset in the added entry, an offset set in an entry which is included in all entries selected from the file-LBA table 301 in step S72, and has an LBA list including the latest LBA. After executing step S76, the snapshot management unit 306 completes the first snapshot management processing.

Figure 36:
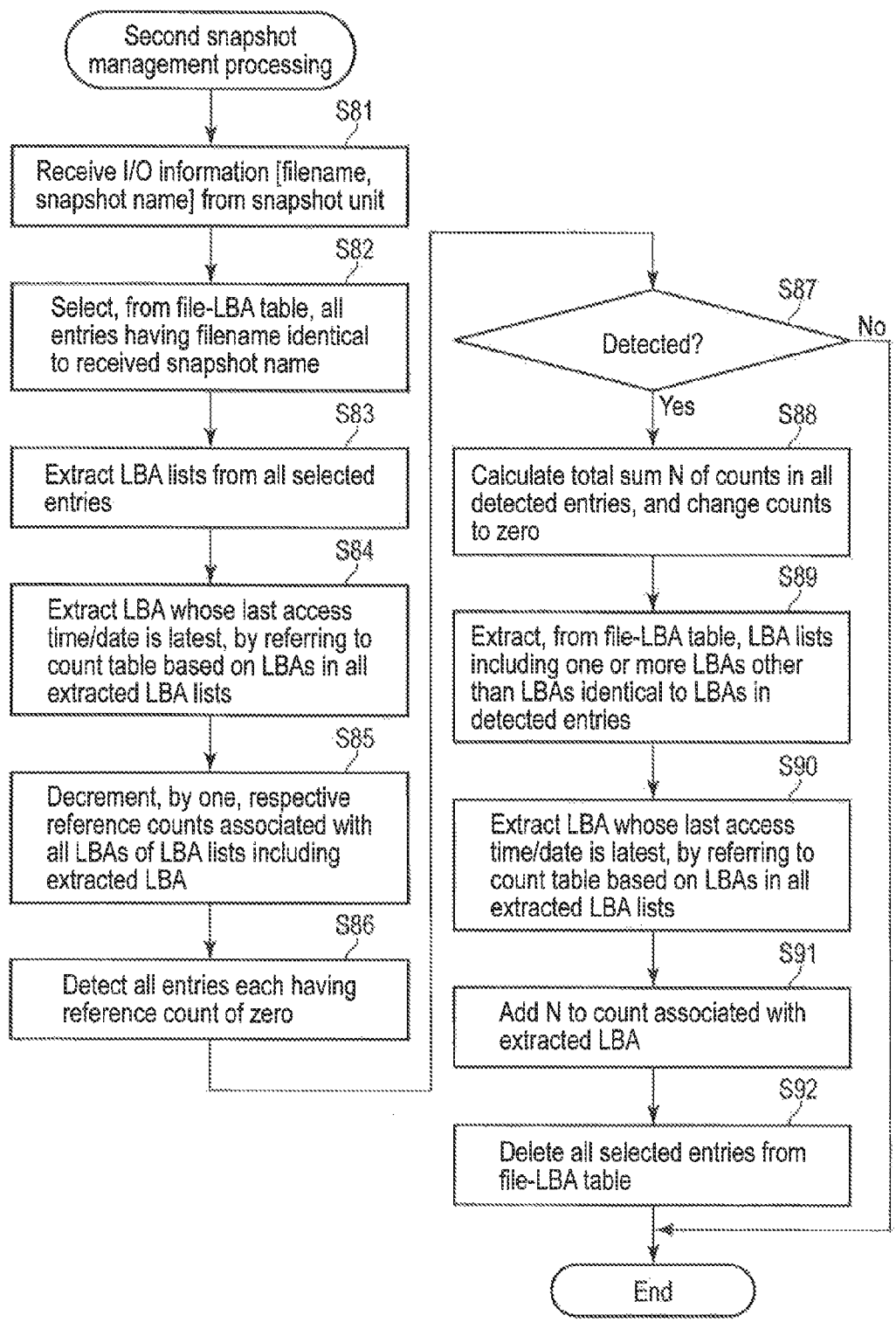
FIG. 36 is a flowchart showing an exemplary procedure of second snap shot management processing in the modification of the third embodiment.

Referring next to FIG. 36, a description will be given of second snapshot management processing performed by the snapshot management unit 306 in the modification of the third embodiment. FIG. 36 is a flowchart showing an exemplary procedure of the second snapshot management processing.

First, assume that the snapshot unit 126 has issued a snapshot deletion request to the file system 1210. Assume also that the snapshot deletion request includes the combination of filename F1 of file F and snapshot name SS1. The snapshot unit 126 passes, to the daemon 124c, the same I/O information [filename=F1, snapshot name=SS1] as the combination of filename F1 and, snapshot name SS1 included in the snapshot deletion request.

At this time, the snapshot management unit 306 of the daemon 124c executes the second snapshot management processing indicated by the flowchart of FIG. 36, as follows: First, the snapshot management unit 306 receives I/O information [filename=F1, snapshot name=SS1] from the snapshot unit 126 (step S81).

Next, the snapshot management unit 306 selects, from the file-LBA table 301, all entries having the same filename as received filename F1 (step S82). After that, the snapshot management unit 306 executes steps S83 and S84. Steps S83 and S84 correspond to steps S73 and S74 in the above-described first snapshot management processing, respectively. Thus, the snapshot management unit 306 extracts a latest LBA by the execution of steps S83 and S84. If necessary, in the above description associated with the first snapshot management, processing, steps S73 and S74 may be replaced with steps S83 and S84, respectively.

Next, the snapshot management unit 306 selects all entries that are included in the count table 302c and associated with all LBAs in the LBA list including the extracted LBA, and decrements, by one, respective reference counts in all selected entries (step S85). Next, the snapshot management unit 306 searches the count table 302c for all entries, as target entries, which each have a reference count changed to zero by the above (step S86) decrement operation (step S87).

If the target entries have been detected (Yes in step S97), the snapshot management unit 306 calculates the total sum N of counts in all detected entries, and changes the counts in all entries into zero (step S88). An LBA in each detected entry indicates a logical block as the storage destination of data that was previously referred to as one or more snapshots but has become not to be referred to. If only one entry has been detected, the snapshot management unit 306 determines a count in the one entry as the total sum N.

Next, the snapshot management unit 306 refers to the file-LBA table 301, and designates all entries that have LBA lists including the LBAs in the detected entries (step S89). In step S89, the snapshot management unit 306 extracts, from the designated entries, all LBA lists including two or more LBAs. The extracted LBA lists include LBAs in the detected entries. That is, the snapshot management unit 306 extracts, from the file-LBA table 301, two or more LBA lists that include at least one LBA other than LBAs coinciding with the LBAs in the detected entries.

Next, the snapshot management unit 306 executes step S90 corresponding to step S74 (S84) in the first (second) snapshot management processing. That is, based on all LBAs in all LBA lists extracted in seep S89, the snapshot management unit 306 refers to all entries that are included in the file-LBA table 301 and associated with the respective LBAs. After that, the snapshot management unit 306 extracts, from all referred entries, an LBA having a latest one of the last access time/dates.

Next, the snapshot management unit 306 adds the total sum N, calculated in step S88, to a count in an entry that is included in the count table 302c, and is associated with the latest LBA extracted in step S90 (step S91). That is, the snapshot management unit 306 carries over the total sum N to a count in the entry associated with the latest LBA, the total sum N being the total sum of counts assumed before the counts are changed to zero in step S88.

Next, the snapshot management unit 306 deletes all entries, selected in step S82, from the file-LBA table 301 (step S92). After that, the snapshot management unit 306 completes the second snapshot management processing.

In the modification of the third embodiment, the snapshot management unit 306 can add a count, which is associated with an LBA indicating the storage destination of data that has become not to be referred to as a snapshot, to a count associated with a latest LBA indicating a storage destination changed by a COW operation. By virtue of this processing, the storage controller 23 of the tiered storage device 20 can realize tiering that correctly reflects the status of an access request issued by the application 122, even when the COW function of the file system 1210 is effective and the tiered storage system (computer 10_1) uses the snapshot function.

In the first to third embodiments and the modification of the third embodiment, data at each offset in a file is relocated to the high-speed storage device 21 or the low-speed storage device 22, in accordance with an access count regardless of the creation time of the file. This relocation will now be described briefly.

First, data Da at offset OFSTa in file Fa is assumed to be stored in logical block LBa designated by LBAa. In this case, the storage controller 23 determines whether data Da is to be stored in the high-speed storage device 21 or the low-speed storage device 22, depending upon whether access count CNTa (for example, an access count in a certain period) associated with LBAa in the access count table 230 exceeds a threshold TH. More specifically, if CNTa>TH, and if data Da is located in the low-speed storage device 22, data Da is relocated to the high-speed storage device 21.

However, if file Fa has been created recently, a relatively long time is required for CNTa to exceed TH, and data Da is located in the low-speed storage device 22 during a relatively long period. In view of this, when file Fa has been newly created, the storage controller 23 may locate data at each offset in file Fa in the high-speed storage device 21, regardless of the access count. In this structure, a data overwrite is also performed as a new data write on the high-speed storage device 21 by the feature of a copy-on-write operation. This may make the high-speed storage device 21 insufficient in storage capacity.

In view of this, for example, the storage controller 23 moves, to the low-speed storage device 22, data that is included in file data located in the high-speed storage device 21, is obtained after a certain period elapses from its creation, and has a small corresponding access count. In the prior art, access counts are inaccurate because they are influenced by the copy-on-write operation, which makes it difficult to appropriately move data having a small access count to the low-speed storage device 22. In contrast, in the first to third embodiments and the modification of the third embodiment, an access count associated with a logical block address as a copy source in the copy-on-write operation can be carried, over to an access count associated with a logical block address as a copy destination in the copy-on-write operation. Therefore, the access count is accurate. This enables data having a small access count to be appropriately moved to the low-speed storage device 22.

In at least one embodiment described above, the access count managed by the storage controller can be corrected in accordance with a file access status recognized by an application even when the copy-on-write function is effective, whereby tiering contributing to the improvement of user's convenience can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tiered storage system comprising:
a tiered storage device; and
a computer which uses the tiered storage device,
wherein:
the tiered storage device comprises
a plurality of storage devices having different access performance; and
a storage controller which controls accesses to the storage devices, the storage controller managing counts of accesses to logical blocks in a logical unit, to which storage areas of the storage devices are allocated block by block, in association with logical block addresses indicating the logical blocks, the storage controller relocating, to one of the storage devices, data stored in the logical blocks, based on access counts associated with the respective logical block addresses;
the computer comprises
a file system which issues a read request or a write request including a logical block address associated with a to-be-accessed block, in accordance with an access request issued from an application operating on the computer and including a filename and relative position information, the relative position information indicating a relative position of the to-be-accessed block included in a file indicated by the filename; and
a device driver which accesses the tiered storage device by sending, to the storage controller, the read request or the write request from the file system;
one of the computer and the tiered storage device further comprises a correction support unit which supports correction of the access counts managed by the storage controller;
the file system manages a file, requested by the application, by associating relative positions, in the file, of blocks constituting the file, with logical block addresses of logical blocks storing data of the blocks constituting the file, and performs, using the device driver, a copy-on-write operation when the access request is a write request WR which requests overwriting of data, the copy-on-write operation including copying to-be-overwritten data from a first logical block storing the to-be-overwritten data to a second logical block different from the first logical block, and then writing, to the second logical block, data designated by the write request WR; and the correction support unit causes the storage controller to carry over an access count managed by the storage controller and associated with a logical block address indicating the first logical block as a copy source in the copy-on-write operation, to an access count associated with a logical block address indicating the second logical block as a copy destination in the copy-on-write operation.

2. The tiered storage system of claim 1, wherein:

the correction support unit detects a change due to the copy-on-write operation in a logical block address associated with a relative position in the file, and notifies the storage controller of a logical block address before the change and a logical block address after the change as an old logical block address indicating the copy source and a new logical block address indicating the copy destination, respectively; and the storage controller carries over an access count associated with the notified old logical block address, to an access count associated with the notified new logical block address.

3. The tiered storage system of claim 2, wherein:

the file system causes the device driver to sequentially send, to the tiered storage device, a read request RR, a write request WR1 and a write request WR2 for the copy-on-write operation according to the write request WR, the read request RR designating reading of data from the first logical block, the write request WR1 designating writing, to the second logical block, the data read in accordance with the read request RR, the write request WR2 designating writing, to the second logical block, data designated by the write request WR; and when a first read request, a first write request and a second write request are sequentially sent from the device driver to the tiered storage device, and when data written in accordance with the first write request is identical to data read in accordance with the first read request, and a logical block address designated by the second write request is identical to a logical block address designated by the first write request, the correction support unit detects that the copy-on-write operation is executed, and a logical block address associated with a relative position, in a file, of data read in accordance with the first read request is changed.

4. The tiered storage system of claim 3, wherein:

when sending the read request or the write request to the tiered storage device, the device driver sends, to the correction support unit, first input/output information including an identifier indicating read or write, a logical block address designated by the read request or the write request, and a hash value of data read in accordance with the read request or of write data designated by the write request; and the correction support unit detects the change in the logical block address due to the copy-on-write operation, based on the first input/output information from the device driver.

5. The tiered storage system of claim 4, wherein:

the correction support unit manages, using one of entries of a data management table, a relationship between a logical block address of a copy source of data in the copy-on-write operation, a logical block address of a copy destination of the data, and a hash value of the data, the logical block address of the copy source being defined as an old logical block address, the logical block address of the copy destination being defined as a new logical block address;

the correction support unit checks the identifier in the first input/output information upon receiving the first input/output information, and adds, to the data management table, an entry having the logical block address in the first input/output information as an old logical block address, a hash value equal to the hash value in the first input/output information, and no new logical block address when the identifier indicates the read;

the correction support unit searches the data management table for an entry having a hash value equal to the hash value in the first input/output information, and no new logical block address, and sets the logical block address in the first input/output information in the detected entry as a new logical block address, when the identifier in the first input/output information indicates the write; and the correction support unit searches the data management table for an entry having a new logical block address identical to the logical block address in the first input/output information, and notifies the storage controller of an old logical block address and the new logical block address in the detected entry, when the entry which has the hash value equal to the hash value in the first input/output information and has no new logical block address is not detected.

6. The tiered storage system of claim 5, wherein the correction support unit deletes, from the data management table, the entry having the notified old and new logical block addresses.

7. The tiered storage system of claim 5, wherein after a certain period elapses from addition or updating the entry, the correction support unit deletes the entry from the data management table.

8. The tiered storage system of claim 4, wherein:

the computer further comprises
a cache buffer used to store read data read from the tiered storage device and write data to be written to the tiered storage device; and
a cache controller which controls accesses to the cache buffer, manages a directory of data stored in the cache buffer, and sends, to the correction support unit, second input/output information including a buffer address indicating a write destination of the write data and a hash value of the write data, upon writing of the write data to the cache buffer based on the write request from the file system; and the correction support unit detects the change in the logical block address due to the copy-on-write operation, based on the first input/output information from the device driver and the second input/output information from the cache controller.

9. The tiered storage system of claim 8, wherein:

the correction support unit manages, using one of entries of a data management table, a relationship between a logical block address of a copy source of data in the copy-on-write operation, a logical block address of a copy destination of the data, a buffer address indicating a storage destination of the data in the cache buffer, a hash value of the data, and a hash value of to-be-overwritten data in the copy destination, the logical block address of the copy source being defined as an old logical block address, the logical block address of the copy destination being defined as a new logical block address, the hash value of the data being defined as an old hash value, the hash value of the to-be-overwritten data in the copy destination being defined as a new hash value;

the correction support unit checks the identifier in the first input/output information upon receiving the first input/output information, and adds, to the data management table, an entry having the logical block address and the hash value in the first input/output information as an old logical block address and an old hash value, respectively, when the identifier indicates the read;

the correction support unit searches the data management table for an entry having a buffer address identical to the buffer address in the second input/output information upon reception thereof, and sets, in the detected entry, the hash value in the second input/output information as a new hash value;

when having not detected the entry which has the buffer address identical to the buffer address in the second input/output information, the correction support unit searches the data management table for an entry having an old hash value equal to the hash value in the second input/output information, and sets, in the detected entry, the buffer address in the second input/output information;

when the identifier indicates the write, and the data management table does not include an entry having an old logical block address identical to the logical block address in the first input/output information, the correction support unit searches the data management table for an entry having a new hash value equal to the hash value in the first input/output information, sets, in the detected entry, the logical block address in the first input/output information, as the new logical block address and then notifies the storage controller of an old logical block address and the new logical block address in the detected entry; and when having not detected an entry having a new hash value equal to the hash value in the first input/output information, the correction support unit adds, to the data management table, an entry having the logical block address and the hash value in the first input/output information as an old logical block address and an old hash value, respectively.

10. The tiered storage system of claim 1, wherein:

when sending the read request or the write request to the tiered storage device, the device driver sends, to the correction support unit, first input/output information including a logical block address designated by the read request or the write request, and a hash value of data read in accordance with the read request or write data designated by the write request;

the application sends, to the correction support unit, a filename, relative position information and second input/output information in accordance with issuance of the access request, the second input/output information including a hash value of data read or written in accordance with the access request;

the correction support unit manages, using one of entries of a mapping table, a relationship between a filename for a file, relative position information indicating a relative position in the file, and a logical block address list, the logical block address list including a series of logical block addresses associated with the relative position in the file;

the correction support unit manages, using entries of a count table, a relationship between respective logical block addresses included in logical block address lists in all entries of the mapping table, counts of accesses to logical blocks designated by the respective logical block addresses, and last access time/date information indicating a time/date of a last access to each of the logical blocks;

the correction support unit adds an entry to the mapping table or updates content of an entry in the mapping table, based on the first input/output information from the device driver and the second input/output information from the application;

the correction support unit adds an entry to the count table or updates content of an entry in the count table, based on the first input/output information; and the correction support unit searches the count table for entries associated with logical block addresses included in a logical block address list in each of the entries of the mapping table, and causes the storage controller to carry over a total sum of counts in entries included in the detected entries and except for an entry having a latest one of last access time/dates, to an access count managed by the storage controller and associated with the logical block address in the entry having the latest one of the last access time/dates.

11. The tiered storage system of claim 10, wherein the correction support unit causes the storage controller to correct access counts included in access counts managed by the storage controller and associated with the logical block addresses included in the count correction information, based on the counts included in the count correction information, by changing a count in the latest entry into the total sum, changing, to negative values, counts in the entries except for the latest entry, and sending, to the storage controller, count correction information including a series of combinations of logical block addresses in entries with the changed counts, and the changed counts.

12. The tiered storage system of claim 11, wherein:

the computer further comprises a snapshot unit which requests the filter system to create and delete a snapshot of a file;

each of the entries of the count table stores a reference count, in addition to the logical block address, the count and the last-access-time/date information, the reference count indicating how many different snapshots are concurrently referred to when data stored in a logical block indicated by the logical block address is concurrently referred to as the different snapshots;

the correction support unit searches the count table for a first entry having a reference count of zero;

when having detected the first entry, the correction support unit extracts, from the mapping table, a first logical block address list having a plurality of logical block addresses including a first logical block address in the first entry; and the correction support unit adds a first count in the first entry to a second count in a second entry, and changes the first count to zero, the second entry being included in a plurality of entries of the count table associated with the respective logical block addresses in the first logical block address list and having last-access-time/date information indicating a latest one of last access time/dates.

13. The tiered storage system of claim 12, wherein:

the snapshot unit sends, to the correction support unit, third input/output information including a snapshot name and a filename in accordance with a snapshot create request or a snapshot deletion request to the file system, the snapshot name indicating a snapshot to be created or deleted, the filename indicating a file corresponding to the snapshot to be created or deleted;
when the third input/output information corresponds to the snapshot create request, the correction support unit selects, from the mapping table, all entries having a filename coinciding with the filename in the third input/output information, and extracts second logical block address lists from the selected entries;
the correction support unit specifies a third entry having last-access-time/date information indicating a latest one of the last access time/dates and extracts a third logical block address in the third entry as a latest logical block address, by referring to the count table based on all logical block addresses in the second logical block address lists;
the correction support unit increments reference counts in entries of the count table associated with all logical block addresses in a logical block address list including the third logical block address;
the correction support unit adds, to the mapping table, an entry having a filename coinciding with the filename in the third input/output information, an offset equal to an offset in the third entry, and the third logical block address;
when the third input/output information corresponds to the snapshot deletion request, the correction support unit selects, from the mapping table, all entries having a snapshot name coinciding with a snapshot name in the third input/output information, and extracts third logical block address lists from the selected entries;
the correction support unit specifies a fourth entry having last-access-time/date information indicating a latest one of the last access time/dates and extracts a fourth logical block address in the fourth entry as a latest logical block address, by referring to the count table based on all logical block addresses in the third logical block address lists; and
the correction support unit decrements reference counts in entries of the count table associated with all logical block addresses in a logical block address list including the fourth logical block address.

14. The tiered storage system of claim 1, wherein the correction support unit operates on a background of one of an operating system and the storage controller, and the operating system includes the file system.

15. A computer using a tiered storage device, the tiered storage device comprising a plurality of storage devices having different access performance, and a storage controller which controls accesses to the storage devices, the storage controller managing counts of accesses to logical blocks in a logical unit, to which storage areas of the storage devices are allocated block by block, in association with logical block addresses indicating the logical blocks, the storage controller relocating, to one of the storage devices, data stored in the logical blocks, based on access counts associated with the respective logical block addresses, the computer comprising:
a file system which issues a read request or a write request including a logical block address associated with a to-be-accessed block, in accordance with an access request issued from an application operating on the computer and including a filename and relative position information, the relative position information indicating a relative position of the to-be-accessed block included in a file indicated by the filename;
a device driver which accesses the tiered storage device by sending, to the storage controller, the read request or the write request from the file system; and
a correction support unit which supports correction of an access count managed by the storage controller,
wherein:
the file system manages a file, requested by the application, by associating relative positions, in the file, of blocks constituting the file, with logical block addresses of logical blocks storing data of the blocks constituting the file, and performing, using the device driver, a copy-on-write operation when the access request is a write request WR which requests overwriting of data, the copy-on-write operation including copying to-be-overwritten data from a first logical block storing the to-be-overwritten data to a second logical block different from the first logical block, and then writing, to the second logical block, data designated by the write request WR; and
the correction support unit causes the storage controller to carry over an access count managed by the storage controller and associated with a logical block address indicating the first logical block as a copy source in the copy-on-write operation, to an access count associated with a logical block address indicating the second logical block as a copy destination in the copy-on-write operation.

16. The computer of claim 15, wherein:
the correction support unit detects a change due to the copy-on-write operation in a logical block address associated with a relative position in the file, and notifies the storage controller of a logical block address before the change and a logical block address after the change as an old logical block address indicating the copy source and a new logical block address indicating the copy destination, respectively; and
the storage controller carries over an access count associated with the notified old logical block address to an access count associated with the notified new logical block address.

17. The computer of claim 16, wherein:
the file system causes the device driver to sequentially send, to the tiered storage device, a read request RR, a write request WR1 and a write request WR2 for the copy-on-write operation according to the write request WR, the read request RR designating reading of data from the first logical block, the write request WR1 designating writing, to the second logical block, the data read in accordance with the read request RR, the write request WR2 designating writing, to the second logical block, data designated by the write request WR; and
when a first read request, a first write request and a second write request are sequentially sent from the device driver to the tiered storage device, and when data written in accordance with the first write request is identical to data read in accordance with the first read request, and a logical block address designated by the second write request is identical to a logical block address designated by the first write request, the correction support unit detects that the copy-on-write operation is executed, and a logical block address associated with a relative position, in a file, of data read in accordance with the first read request is changed.

18. A method, in a computer using a tiered storage device, of correcting a count of accesses to a file, the tiered storage device comprising a plurality of storage devices having different access performance, and a storage controller which controls accesses to the storage devices, the storage controller managing counts of accesses to logical blocks in a logical unit, to which storage areas of the storage devices are allocated block by block, in association with logical block addresses indicating the logical blocks, the storage controller relocating, to one of the storage devices, data stored in the logical blocks, based on access counts associated with the respective logical block addresses, the computer comprising a file system which manages a file, requested by an application operating on the computer, by associating relative positions, in the file, of blocks constituting the file, with logical block addresses of logical blocks storing data of the blocks constituting the file, the method comprising:

causing the file system to perform a copy-on-write operation, upon receiving, from the application, a write request WR which requests overwriting of data, the copy-on-write operation including copying to-be-overwritten data from a first logical block storing the to-be-overwritten data to a second logical block different from the first logical block, and then writing, to the second logical block, data designated by the write request WR; and causing the storage controller to carry over an access count managed by the storage controller and associated with a logical block address indicating the first logical block as a copy source in the copy-on-write operation, to an access count associated with a logical block address indicating the second logical block as a copy destination in the copy-on-write operation.

19. The method of claim 18, further comprising:

detecting a change due to the copy-on-write operation in a logical block address associated with a relative position in the file, and notifying the storage controller of a logical block address before the change and a logical block address after the change as an old logical block address indicating the copy source and a new logical block address indicating the copy destination, respectively, causing the storage controller to carry over an access count associated with the notified old logical block address to an access count associated with the notified new logical block address.

20. The method of claim 19, further comprising:

sequentially sending, to the tiered storage device, a read request RR, a write request WR1 and a write request WR2 for the copy-on-write operation according to the write request WR, the read request RR designating reading of data from the first logical block, the write request WR1 designating writing, to the second logical block, the data read in accordance with the read request RR, the write request WR2 designating writing, to the second logical block, data designated by the write request WR; and detecting that the copy-on-write operation is executed, and a logical block address associated with a relative position, in a file, of data read in accordance with a first read request is changed, when the first read request, a first write request and a second write request are sequentially sent to the tiered storage device, and when data written in accordance with the first write request is identical to data read in accordance with the first read request, and a logical block address designated by the second write request is identical to a logical block address designated by the first write request.

* * * * *

UNITED STATES PATENT AND TRADEMARK OFFICE
CERTIFICATE OF CORRECTION

PATENT NO. : 9,933,948 B2
APPLICATION NO. : 15/265589
DATED : April 3, 2018
INVENTOR(S) : Shouhei Saitou et al.

Page 1 of 1

It is certified that error appears in the above-identified patent and that said Letters Patent is hereby corrected as shown below:

On the Title Page

Item (57), Line 8, change "an access count manacled by the storage" to --an access count managed by the storage--.

Signed and Sealed this
Fifth Day of June, 2018

Andrei Iancu
*Director of the United States Patent and Trademark Office*